United States Patent [19]
Heim et al.

[11] Patent Number: 5,793,578
[45] Date of Patent: Aug. 11, 1998

[54] THIN FILM INDUCTION RECORDING HEAD HAVING AN INSET FIRST INSULATION LAYER THAT DEFINES ZERO THROAT HEIGHT AND POLE TIP APEX ANGLE

[75] Inventors: David Eugene Heim, Redwood City; Hugo Alberto Emilio Santini, San Jose, both of Calif.

[73] Assignee: International Business Machines Corporation, Armonk, N.Y.

[21] Appl. No.: 752,012

[22] Filed: Nov. 15, 1996

[51] Int. Cl.$^6$ .................................................. G11B 5/47
[52] U.S. Cl. .................................................. 360/126
[58] Field of Search ............................ 360/113, 126

[56] References Cited

U.S. PATENT DOCUMENTS

| 4,353,102 | 10/1982 | Kanai et al. | 360/126 |
| 4,422,117 | 12/1983 | Nomura et al. | 360/126 |
| 4,490,760 | 12/1984 | Kaminaka et al. | 360/136 |
| 4,636,420 | 1/1987 | Wada et al. | 428/156 |
| 4,745,506 | 5/1988 | Nakamura et al. | 360/123 |
| 4,872,079 | 10/1989 | Roberts | 360/126 |
| 4,875,987 | 10/1989 | Wada et al. | 240/192.15 |

FOREIGN PATENT DOCUMENTS

| 57-113411 | 7/1982 | Japan | G11B 5/12 |
| 60-171616 | 9/1985 | Japan | G11B 5/31 |
| 61-45408 | 3/1986 | Japan | G11B 5/31 |
| 61-131215 | 6/1986 | Japan | G11B 5/31 |
| 62-162213 | 7/1987 | Japan | G11B 5/31 |
| 63-58610 | 3/1988 | Japan | G11B 5/31 |
| 2-79206 | 3/1990 | Japan | G11B 5/31 |
| 2-244415 | 9/1990 | Japan | G11B 5/31 |
| 2-302916 | 12/1990 | Japan | G11B 3/31 |

*Primary Examiner*—A. J. Heinz
*Attorney, Agent, or Firm*—Baker Maxham Jester & Meador

[57] ABSTRACT

The present invention uncouples the dependence between the zero throat height and the flare point of a write head by recessing the first insulation layer within the first pole piece layer. The first pole piece layer and the first insulation layer have planar surfaces which preferably lie in a common plane, the zero throat height being defined at the point where the planar surface of the first pole piece layer first meets the planar surface of the first insulation layer within the head. It is also at this point that the first and second pole piece layers separate from one another. Accordingly, the zero throat height can be accurately placed relative to the stripe height of a magneto-resistive (MR) sensor. Further, when a photoresist layer is spun onto the partially completed head for the construction of the pole tip of the second pole piece light directed into the photoresist layer for photo-imaging the pole tip does not reflect into the photoresist layer adjacent the pole tip. Accordingly, there is substantially no reflective notching of the photoresist layer because of the flatness of the surfaces of the first pole piece layer and the first insulation layer thereby permitting construction of a well defined second pole tip.

50 Claims, 15 Drawing Sheets

THIN FILM INDUCTION RECORDING HEAD HAVING AN INSET FIRST INSULATION LAYER THAT DEFINES ZERO THROAT HEIGHT AND POLE TIP APEX ANGLE

BACKGROUND OF THE INVENTION

1. Field of the Invention

The present invention relates to a thin film magnetic recording head with an inset insulation layer that defines zero throat level with a substantially perpendicular apex angle, and more particularly to such a recording head with a first insulation layer in a notch milled in a first pole piece layer of the head to define the zero throat height of the head with substantially flat topography at the front of the head.

2. Description of the Related Art

A thin film inductive write head includes one or more coil layers embedded in an insulation stack, the insulation stack being sandwiched between first and second pole piece layers. A write gap is formed in a pole tip region by provision of a gap layer between the pole pieces. The pole pieces are magnetically coupled in a back gap region. Between the pole tip region and the back gap region is a yoke region where the pole piece layers separate from one another to accommodate the insulation stack. The insulation stack typically includes a first insulation layer (I1) on the first pole piece layer, one or more coil layers on the first insulation layer, a second insulation layer (I2) over the coil layer and a third insulation layer (I3) over the second insulation layer.

A combined head, such as a merged magnetoresistive (MR) head, includes the aforementioned write head as a write head portion combined with an MR read head portion. The MR read head portion includes an MR sensor which is sandwiched between first and second gap layers which are, in turn, sandwiched between first and second shield layers. In a merged MR head a single layer serves a double function as a second shield layer for the read head and as a first pole piece for the write head. The combined head is carried on a slider which, in turn, is mounted on a suspension in a magnetic disk drive. The suspension is mounted to an actuator which moves the combined head over selected tracks on a rotating disk for reading and writing signals thereon. As the disk rotates a cushion of air is developed to provide an air bearing between the disk and the slider which counterbalances a loading force exerted by the suspension. A surface of the slider facing the disk is called an air bearing surface (ABS) and is typically spaced from the disk in the order of 0.050 μm when the disk is rotating.

In the fabrication of a thin film magnetic write head it is important that zero throat height (ZTH) be accurately located. The zero throat height is the distance along a normal to the ABS between the ABS and a first location where the first and second pole piece layers separate due to topography of one of the insulation layers in the aforementioned insulation stack. Typically, an apex of the first insulation layer defines the ZTH. The apex is the foremost end of the first insulation layer closest to the ABS. The first insulation layer is hard baked resist which imposes on the layer an upwardly sloping surface which commences at the apex forming an apex angle with the plane of the write gap layer. Accordingly, the sloping surface of the first insulation layer angles toward the second pole piece, causing an angled separation of the first and second pole piece layers which commences at the apex. The apex angles of the first, second and third insulation layers cause pronounced slopes which rise from the ZTH and face the pole tip region. After hard baking, these layers high optical reflectivity presents a problem in the fabrication of the second pole tip.

For good magnetic operation, it is important that the sidewalls of the second pole tip be planar and perpendicular to the ABS. When these sidewalls are irregular a portion of the write signal is induced into adjacent disk tracks, causing overwriting. One remedy is to make the tracks wider; however, this reduces the storage density of the disk. Therefore, in order to maintain high storage density, the art has endeavored to make the sidewalls of the pole tip regular. Two design considerations make this endeavor difficult. First, the first and second pole piece layers must separate as near as possible to the ABS in order to minimize flux transfer between the pole tips behind the ABS. This requires that the distance between the ABS and the zero throat height (ZTH) be minimized. Second, the second pole piece should widen as near as possible to the ABS to minimize saturation of the second pole tip. This widening commences at the "flare point". The ZTH is typically located between the ABS and the flare point. When both the ZTH and the flare point are close to the ABS, the optical reflectivity of the front slope of the insulation stack presents a problem in the fabrication of the second pole tip.

The second pole tip is constructed by spinning a thick photoresist layer on top of the insulation stack, over the site for the second pole tip. Ultraviolet light is then directed onto the photoresist through a mask which outlines the shape of the second pole tip. In the prior art, the flare point is behind the ZTH, over the front sloping reflective surface of the insulation stack. That portion of the ultraviolet light which is directed behind the flare point is reflected from the front slope of the insulation stack, enlarging the exposure of the photoresist on each side of the intended sidewalls of the second pole tip. When the photoresist is developed, the photoresist mask at the second pole tip region may be undesirably wide. This undesirably widens the second pole tip which leads to its irregularity.

Another problem in the fabrication of thin film magnetic recording heads is the inaccurate placement of ZTH as mentioned hereinabove. Relatedly, combined heads are typically fabricated in batches on wafers using thin film techniques. At a known stage (the "row level"), a wafer is sliced into rows, with each row comprising a 1×N array of combined heads. Each row is lapped to form an ABS for each head in the row. In each head the MR stripe of the read element and the read gap of the write element intersect the ABS. Lapping continues until the ABS is as close as possible to establish the final electrical resistance of the MR stripe. Ideally, the ZTH and the end of the MR stripe in the read element should be finalized at selected locations. Unfortunately, the initial location of the ZTH at the apex of the first insulation layer is typically altered by post processing of a head. After fabrication, the first insulation layer is sputter cleaned in preparation for a seedlayer which is employed to fabricate the coil layer. This first sputtering step removes some of the first insulation layer and alters the location of its apex. After cleaning, the seedlayer is deposited and masked for the coil layer. Unwanted seedlayer portions are removed by a second sputter step. The second sputter step again removes a portion of the first insulation layer, altering the location of its apex. After formation of the final insulation layer, the insulation stack is sputter cleaned in preparation for a seedlayer employed for fabricating the second pole piece. This third sputter step again removes a portion of the first insulation layer and alters the location of its apex. After these sputter steps the apex of the first insulation layer, and thus ZTH of the head, can be recessed as much as 0.25 μm into the head away from its intended location in an uncontrollable way.

A further problem with the insulation stack is its proximity to the ABS. Unfortunately, the coefficients of expansion of the materials of the insulation stack and the pole piece layers are markedly different. When the write head is operated, the coil layers generate heat, which causes expansion of the insulation stack and pole pieces. The material of the insulation stack expands more than the pole piece material, causing the pole tips to protrude beyond the ABS of the slider. This same expansion of the insulation stack can cause an overcoat layer of the head to crack.

Accordingly, there is a strong felt need to overcome or minimize the aforementioned problems associated with prior art inductive write heads.

SUMMARY OF THE INVENTION

The present invention provides an inductive write head wherein the ZTH is defined by a first insulation layer that is inset in a notch formed in the first pole piece. A surface of the first insulation layer and a portion of a surface of the first pole piece layer are coplanar in the pole tip region, and beyond if desired. This eliminates the slope formerly caused by the first insulation layer and reduces reflective notching which was common in the prior art. The second and third insulation layers may now be recessed further into the head from the ABS since they are not needed to define the ZTH or an apex angle. Accordingly, the effect of reflection from the second and third insulation layers on the construction of the second pole tip is drastically reduced. When post processing sputtering steps are employed, there will be no change in the location of the ZTH since the first insulation layer does not present a slope that is exposed to the sputtering. This enables a reliable relative placement of the ZTH and the MR stripe. Also, the first insulation layer can be made of a material which has a closer coefficient of expansion to the material of the pole piece layers. Further these materials provide a better heat sink than polymer photoresist.

An object of the present invention is to provide an inductive write head which has a well defined second pole tip.

Another object is to provide an inductive write head which has an accurately located zero throat height (ZTH).

A further object is to provide an inductive write head which does not exhibit a large pole tip protrusion and cracking of an overcoat layer due to expansion of the insulation stack.

Still another object is to provide an inductive write head which has improved heat dissipation upon operation of the write coil.

Still a further object is to provide an inductive write head which accomplishes all of the aforementioned objects.

Still another object is to provide a method of making an inductive write head which has a well defined second pole tip.

Still a further object is to provide a method for making an inductive write head which has an accurately located zero throat height (ZTH).

Still another object is to provide a method of making an inductive write head which is not subject to pole tip protrusion and cracking of an overcoat layer due to expansion of the insulation stack.

Still a further object is to provide a method of making an inductive write head which has improved heat dissipation upon operation of the write coil.

Still another object is to provide a method of making an inductive write head which accomplishes all of the aforementioned methods.

Other objects and advantages of the present invention will become apparent upon reading the following description taken together with the accompanying drawings

DESCRIPTION OF THE PREFERRED EMBODIMENTS

Figure 1:
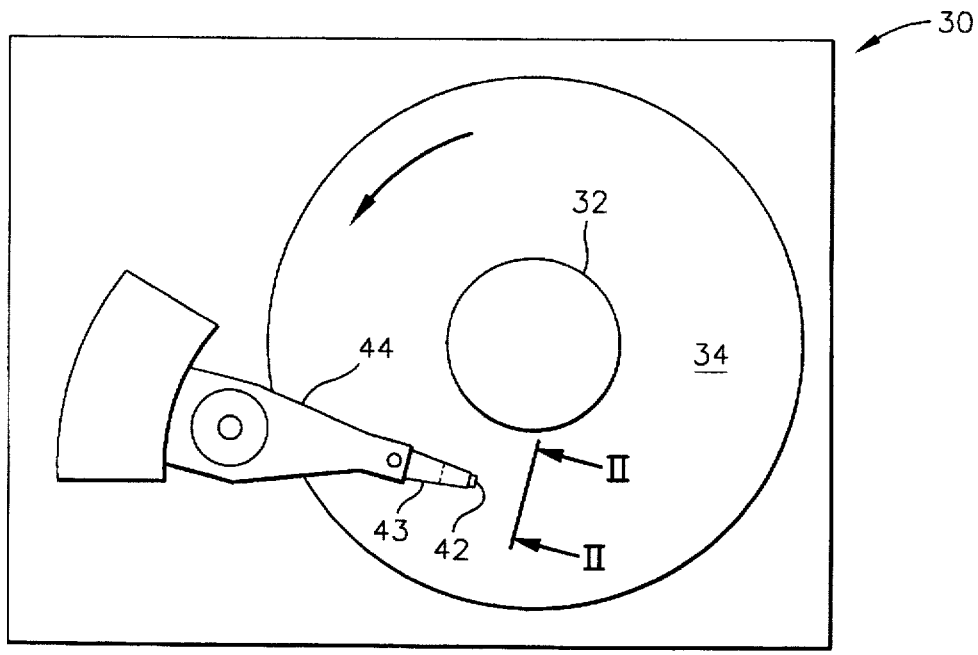
FIG. 1 is a planar view of an exemplary magnetic disk drive.
Figure 2:
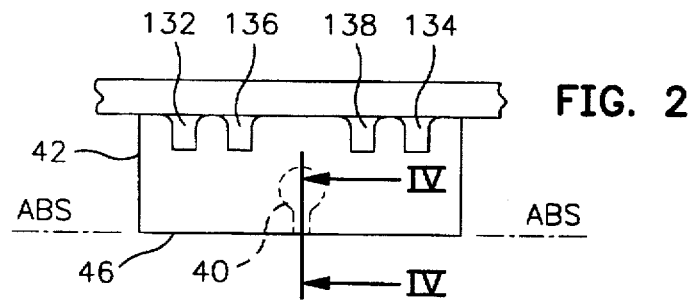
FIG. 2 is an end view of a slider with a magnetic head of the disk drive taken along plane II—II of FIG. 1.
Figure 3:
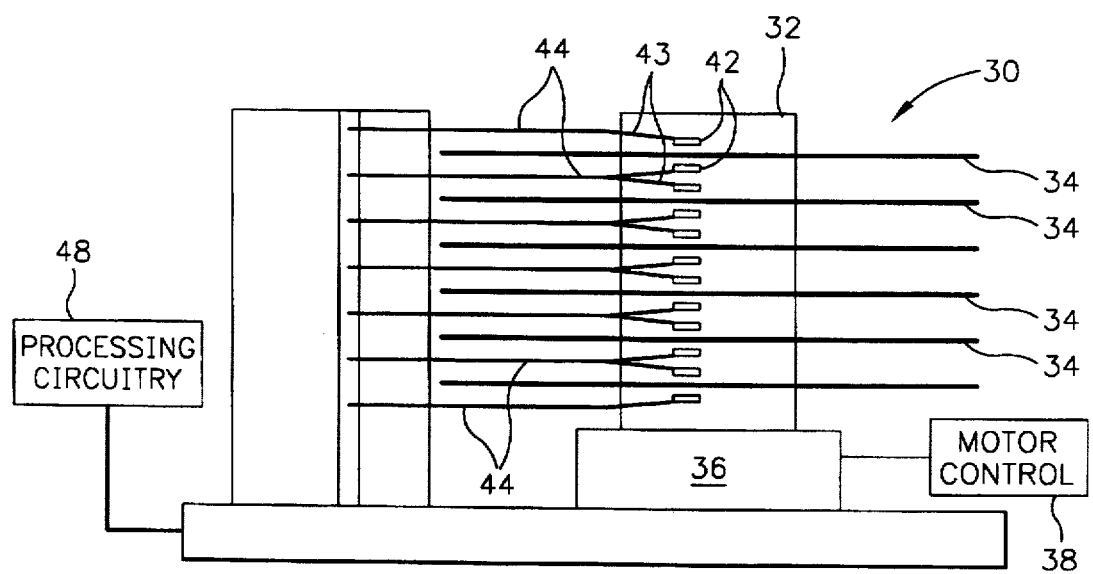
FIG. 3 is an elevation view of the magnetic disk drive wherein multiple disks and magnetic heads are employed.

Referring now to the drawings wherein like reference numerals designate like or similar parts throughout the several views there is illustrated in FIGS. 1 and 2 a magnetic disk drive 30. The drive 30 includes a spindle 32 which supports and rotates a magnetic disk 34. The spindle 32 is rotated by a motor 36 which in turn is controlled by motor control 38. A magnetic head 40, which may be a merged MR head for recording and reading, is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36 the slider is supported on a thin (typically, 0.05 µm) cushion of air (air bearing) by the air bearing surface (ABS) 46. The magnetic head 40 is then employed for writing information to multiple circular tracks on the surface of the disk 44 as well as for reading information therefrom. Processing circuitry 48 exchanges signals representing such information with the head 40, provides motor drive signals, and also provides control signals for moving the slider to various tracks.

Figure 4:
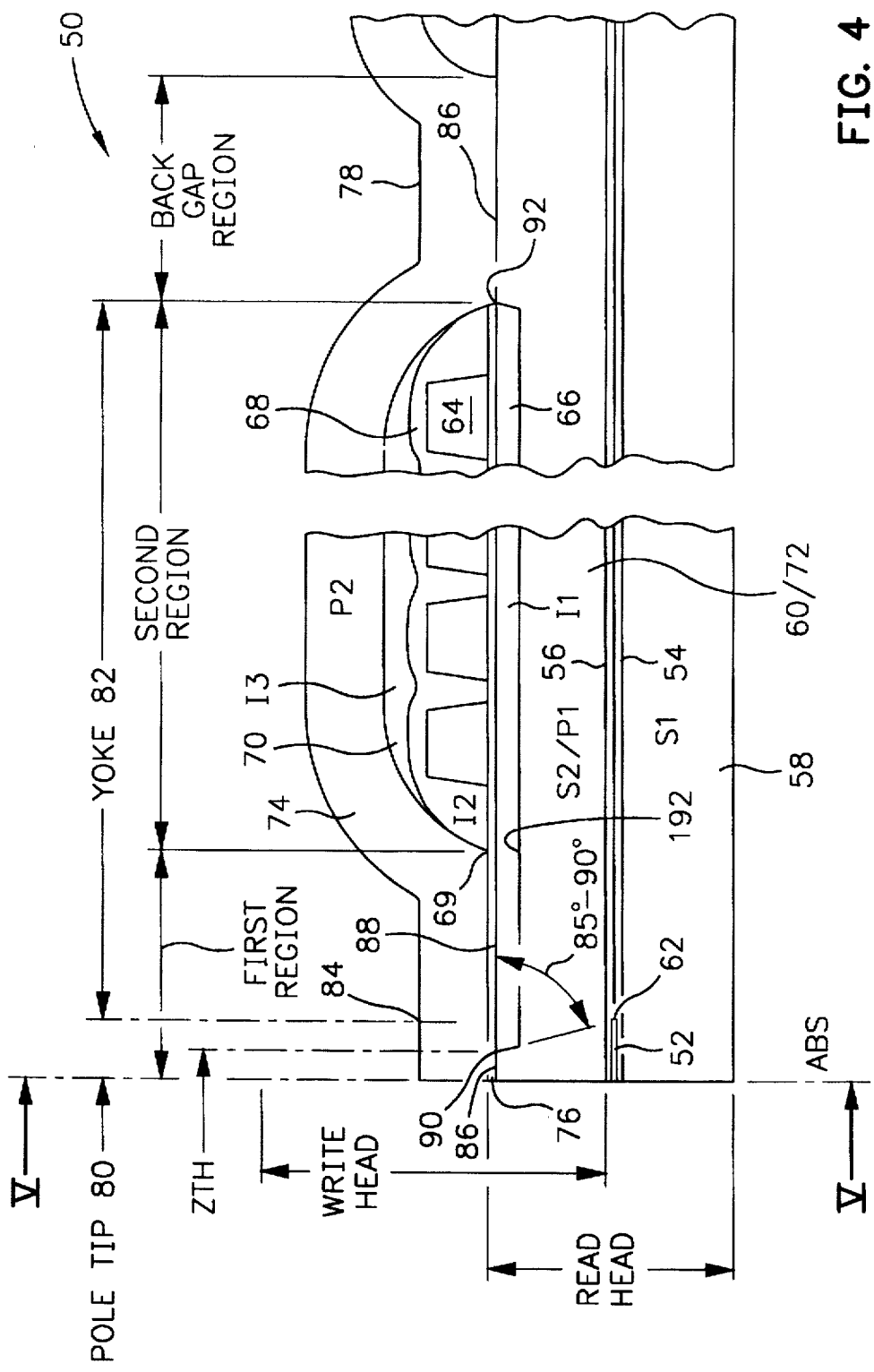
FIG. 4 is an elevation side view of the present head taken along plane IV—IV of FIG. 2.

FIG. 4 is a side cross-sectional elevation view of a merged MR head 50 which has a write head portion and a read head portion, the write head portion employing a first embodiment of the present invention which will be described hereinafter. The read head portion of the merged MR head includes an MR sensor 52 which is sandwiched between the first and second gap layers 54 and 56, the first and second gap layers, in turn, being sandwiched between first and second shield layers 58 and 60. Since S1 is essentially planar, this combined head configuration is referred to as a "flat S1". In response to external magnetic fields, the resistance of the MR sensor 52 changes. A sense current conducted through the sensor causes these changes to be manifested as potential changes. These potential changes are processed by the processing circuitry 48 shown in FIG. 3.

It is important that a recessed end 62 of the MR sensor 52 be accurately located within the head with respect to the ABS so that the MR sensor 52 presents an appropriate resistance to the sense current. The amount of resistance of the MR sensor 52 is inversely proportional to its stripe height, which is the distance between the ABS and the recessed end 62 of the MR sensor 52. Typically, stripe height is determined by the amount of lapping the front of the head undergoes to define the ABS.

Figure 6:
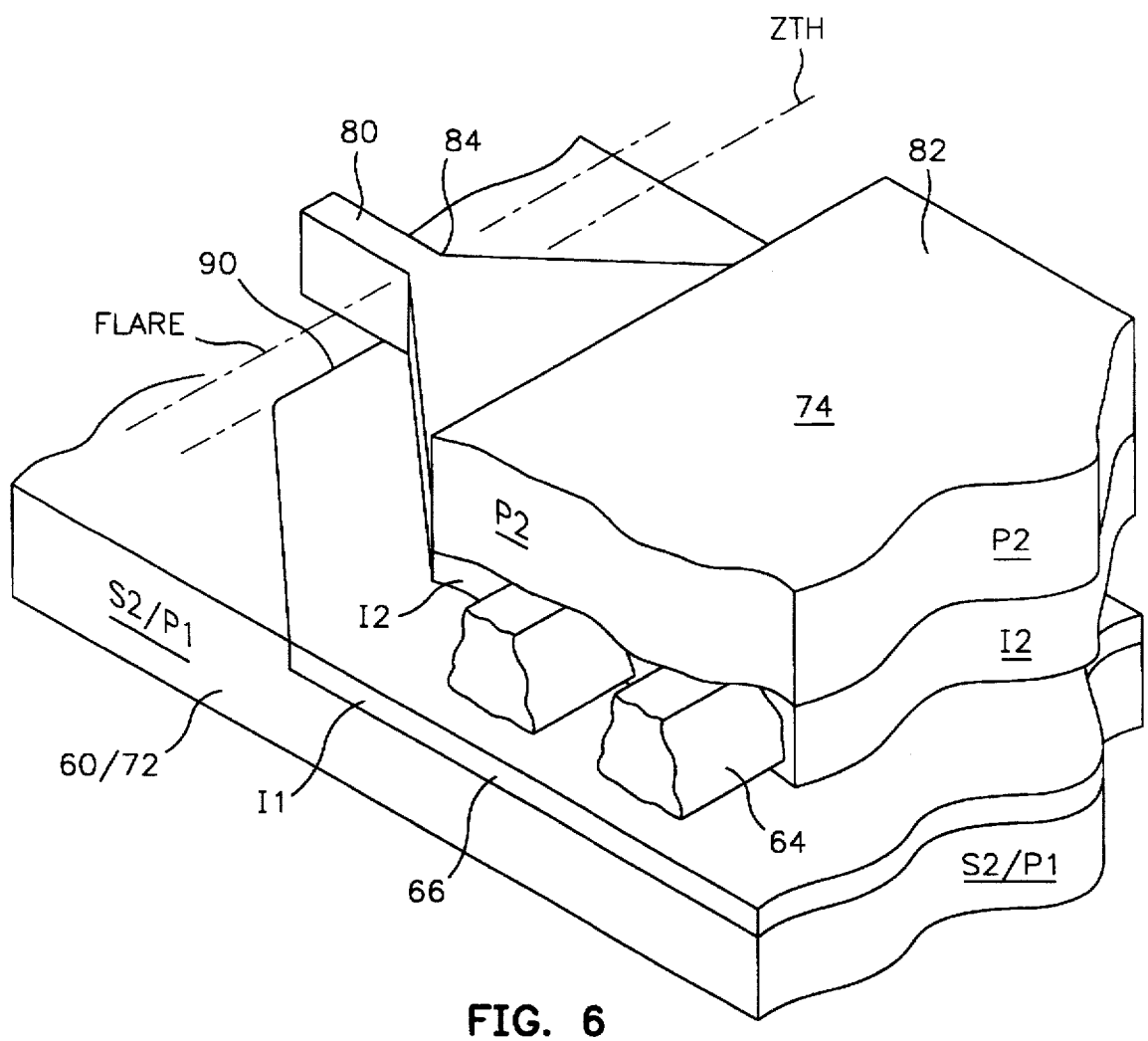
FIG. 6 is an isometric view of the magnetic head shown in FIG. 4.

The write head portion of the head includes a coil layer 64 which is sandwiched between first and second insulation layers 66 and 68. A third insulation layer 70 may be employed for planarizing the head to eliminate ripples in the second insulation layer caused by the coil layer 64. The coil layer 64, and the first, second and third insulation layers 66, 68 and 70 are sandwiched between first and second pole piece layers 72 and 74. The first and second pole piece layers 72 and 74 are separated by a write gap layer 76 at the ABS and are magnetically coupled at a back gap 78 which is spaced from the ABS. As shown in FIGS. 4 and 6, the second pole piece layer 74 has a pole tip 80 and a yoke 82, the separation between these components being defined by a flare point 84 which is the location where the second pole piece layer 74 begins to widen as it recesses in the head. The second pole tip 80 extends between the ABS to the flare point 84, and the yoke is located between the flare point 84 and the back gap 78. Accordingly, the second pole tip 80 defines a pole tip region, the yoke 82 defines a yoke region and the back gap 78 defines a back gap region as shown in FIG. 4.

The write head portion is also divided into first and second regions, as shown in FIG. 4, for purposes of this description. The first region extends from the ABS to the apex 69 of the second insulation layer 68 and the second region extends from the apex 69 of the second insulation layer to termination of the second insulation layer within the head which is shown at 92. In the preferred embodiment, the write gap layer 76 is sandwiched between the first insulation layer 66 and the second pole piece layer 74 in the first region and is sandwiched between the first and second insulation layers 66 and 68 in the second region. It should be noted that the merged MR head 50 employs a single layer 60/72 to serve a double function as a second shield layer for the read head and a first pole piece for the write head. A piggyback MR head employs two separate layers for these functions.

The location of the flare point 84, shown in FIGS. 4 and 6, is an important design parameter of the write head. The further this point is recessed into the head, the longer the pole tip 80 which increases flux leakage between the pole pieces. In the past it has been difficult to locate the flare point closer to the ABS than 10 µm because of a fabrication problem in making the second pole tip 80 which will be described hereinafter.

Another important design parameter in making the write head portion is the location of a zero throat height (ZTH) which is where the first and second pole piece layers 72 and 74 first separate from one another behind the ABS. It is important to locate the ZTH as close as possible to the ABS (typically within about 1 µm) in order to increase the fringe fields across the gap layer 76 at the ABS. In the prior art, locating the ZTH close to the ABS contributed to the aforementioned problem of fabricating a well-defined second pole tip 80. Accordingly, the prior art was faced with a trade-off between the difficulty of constructing the second pole tip 80 if the zero throat height was located close to the ABS and the loss of gap field between the first and second pole pieces 72 and 74 in the pole tip region if the zero throat height was located further away from the ABS.

The present invention overcomes this dilemma by inserting the first insulation layer 66 in a notch, depression or recess 192 provided in the first pole piece layer 72 so that a planar surface 86 of the first pole piece layer and a planar surface 88 of the first insulation layer 66 preferably lie substantially in a common plane so as to be substantially coplanar. The ZTH is defined at notch edge 90, where the planar surface 86 of the first pole piece layer first merges with the planar surface 88 of the first insulation layer. At recess edge 90 the first insulation layer 66 has a negative apex angle of approximately 45°–90° with respect to a normal to the ABS. The apex angle is the angle that the first insulation layer 66 makes with the plane 86 of the first pole piece at recess edge 90. The planar surfaces 86 and 88 have a second merging at recess edge 92 which is further displaced within the head, this recess edge preferably being located at the termination of the second insulation layer 68. In an alternative embodiment a portion of the surfaces 86 and 88 may be sunken in the head which is discussed hereinafter. A significant advantage of the present invention is that the trade-off between the relative positions of the ZTH and the flare point 84 no longer impacts the construction of a well-defined second pole tip 80. Accordingly, the ZTH and the flare point can be independently placed for optimum performance of the head which until now was impossible.

The material for the first insulation layer 66 may be selected from dielectric materials, such as $Al_2O_3$ (alumina) or $SiO_2$ (silicon dioxide). The preferred material is $SiO_2$ for a purpose to be explained hereinafter. The dimensions of the various layers and parameters of the embodiment 50 of the present invention, shown in FIG. 4, are given in Table I, in the third column entitled "Flat S1". The second column ("Prior Art") shows the same information for a prior art write head, and the fourth column ("Sunken S1") shows the same information for another embodiment of the present invention, which will be described next.

TABLE 1

|  | Prior Art | Flat S1 | Sunken S1 |
| --- | --- | --- | --- |
| Write Gap | Under I1 | Over I1 | Over I1 |
| I1 | 1.6 µm ± 40% | .7 µm ± 30% | .7 ± 30% |
|  | 1.6 µm ± 10% | .7 µm ± 10% | .7 ± 10% |
| I2 | Over Coils | Over Coils | Over Coils |
|  | 1.5 µm ± 40% | .6 µm ± 30% | .6 µm ± 30% |
|  | 1.5 µm ± 20% | .6 µm ± 20% | .6 µm ± 20% |
| I3 | Over I2 | Over I2 | Over I2 |
|  | 1.2 µm ± 40% | .5 µm ± 30% | .5 µm ± 30% |
|  | 1.2 µm ± 20% | .5 µm ± 10% | .5 µm ± 10% |
| P2 Thickness | 4.25 µm | 3 µm | 3 µm |
| Flare Point | >1 µm from ZTH | >1 µm from ABS | >1 µm from ABS |
| Final ZTH | 1.25 µm ± 40% | 0.8 µm ± 20% | 0.8 µm ± 20% |
| Apex angle (ZTH defining insulation) | 20°–40° | 85°–90° | 85°–90° |
| P2 Resist Thickness at ZTH | 12 µm + 40% | 5 µm + 25% | 4 µm + 10% |
| Stack Height | 8 to 12 µm | 5 to 6 µm | Less than 1 µm |

Figure 7:
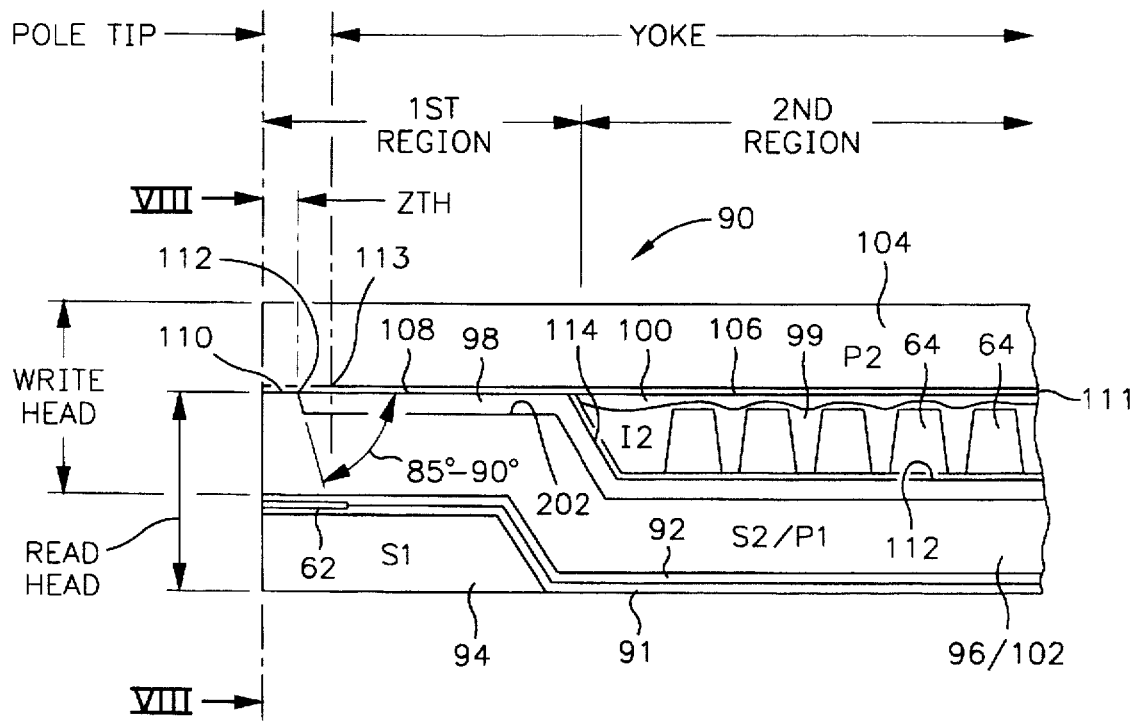
FIG. 7 is an elevation side view of another embodiment of a magnetic head of the present invention.

FIG. 7 shows another merged MR head 90 which has write head and read head portions, the write head portion employing another embodiment of the present invention. The MR head 90 includes the MR sensor 62 which is sandwiched between first and second gap layers 91 and 92 which are in turn sandwiched between first and second shield layers 94 and 96. The write head portion of the head 90 includes the write coil 64 and first, second and third insulation layers 98, 99 and 100 which are sandwiched between first and second pole piece layers 102 and 104. This is a merged MR head because the layer 96/102 serves a double function as a second shield layer for the read head portion and a first pole piece layer for the write head portion. The head 90 differs from the FIG. 4 embodiment in that the first shield layer 94 is shortened so that the first pole piece layer 102 sinks into the head providing a well for the location of the coil layer 64 and the second and third insulation layers 99 and 100. This type of head is described in a co-pending commonly assigned application Ser. No. 08/367,519 filed Dec. 30, 1994 which is incorporated by reference herein. With this arrangement the second insulation layer 99 has a planar surface 106 which lies in a common plane with a planar surface 108 of the first insulation layer 98. This permits the second pole piece layer 104 to be planar throughout its entire length. Since the first shield layer apparently sinks, this configuration is referred to in Table I as "Sunken S1".

Figure 9:
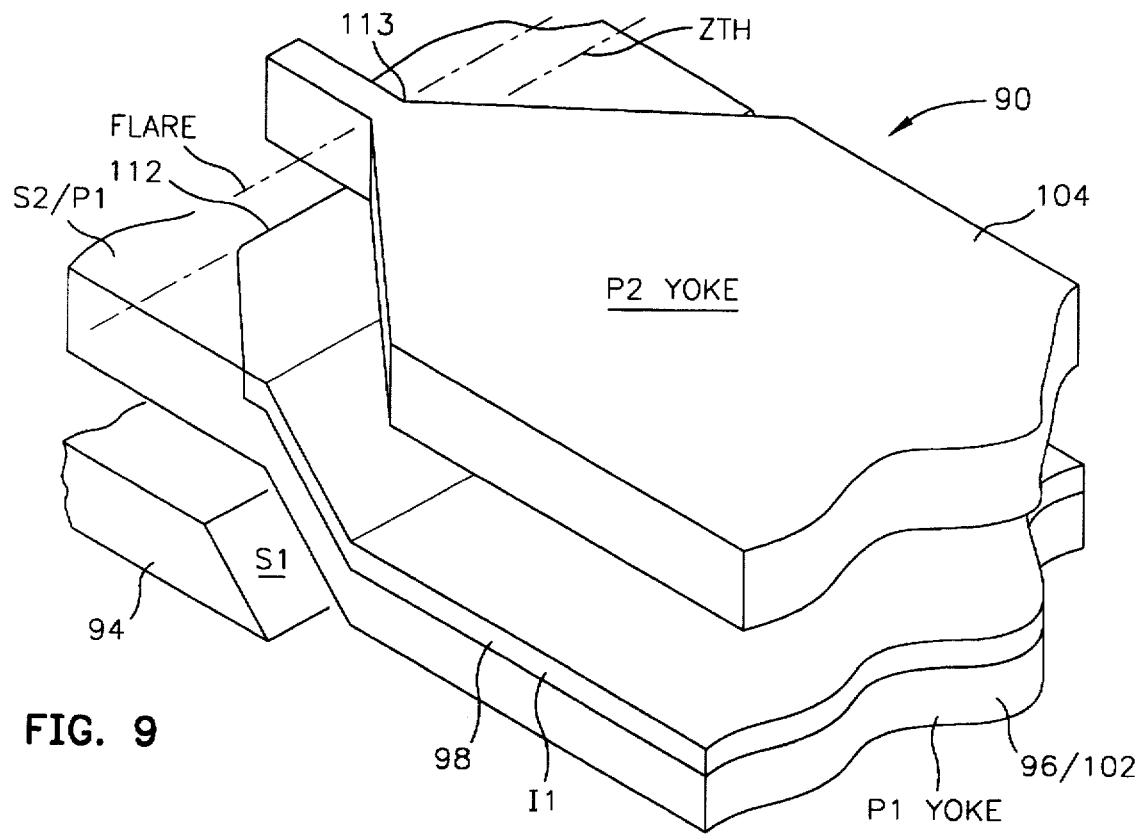
FIG. 9 is an isometric view of the magnetic head shown in FIG. 7.

In the same manner as the FIG. 4 embodiment the first insulation layer 98 in FIG. 7 is inset into a notch or recess 202 formed in the first pole piece layer 102, so that in a first region the planar surface 108 of the first insulation layer preferably lies in a common plane with a planar surface 110 of the first pole piece layer. In a preferred embodiment a write gap layer 111 overlays the planar surfaces 110, 108 and 106 in the first and second regions. As described hereinabove, the recess edge 112 between the first pole piece layer and the first insulation layer 98 defines the zero throat height. The flare point is shown at 113 in FIGS. 7 and 9. This embodiment has the same advantages as the FIG. 4 embodiment in accurately locating the ZTH and freedom to place the ZTH and the flare point at locations which are not dependent upon each other. As a result of the sunken S1 design, the first insulation layer 98 has a stepped portion in the second region, the stepped portion having a planar surface 112 in the second region that lies in a plane that is parallel to the aforementioned common plane and having a sloping portion 114 which joins the planar surfaces 108 and 112 in the first and second regions.

Figure 10:
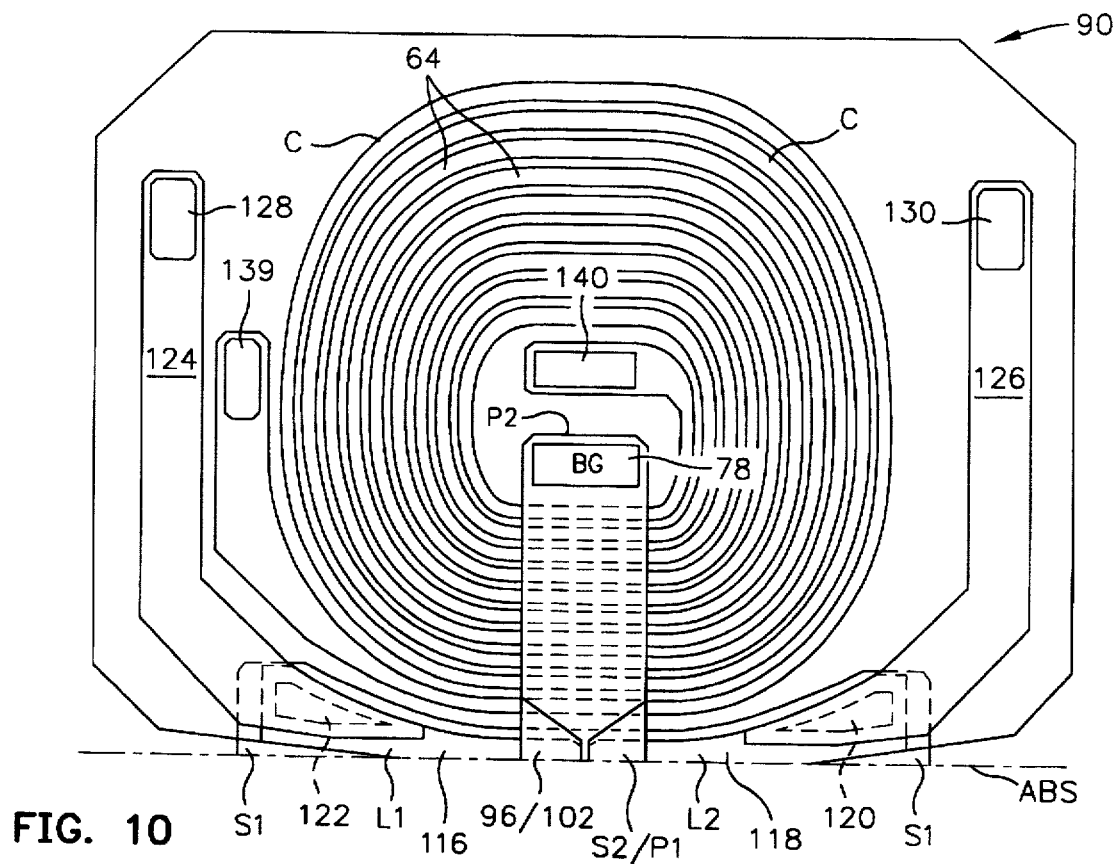
FIG. 10 is a planar illustration of the magnetic head shown in FIG. 7.
Figure 11:
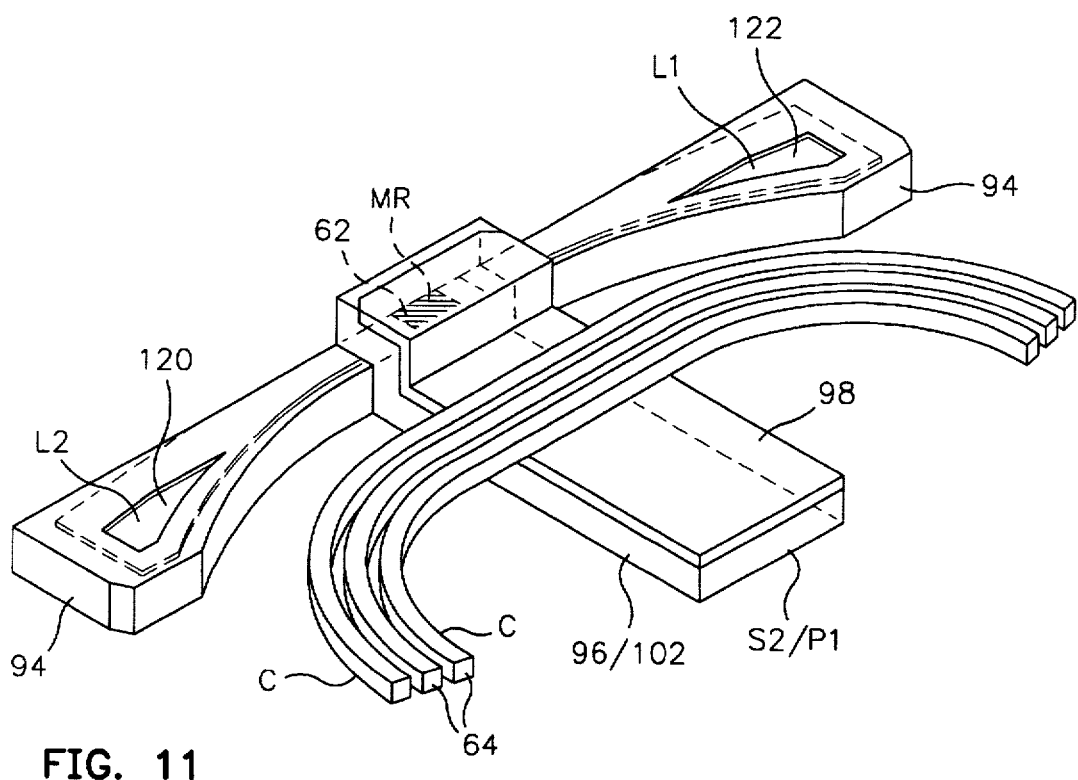
FIG. 11 is an isometric view of the front portion of the magnetic head shown in FIG. 7 with various layers removed.
Figure 12:
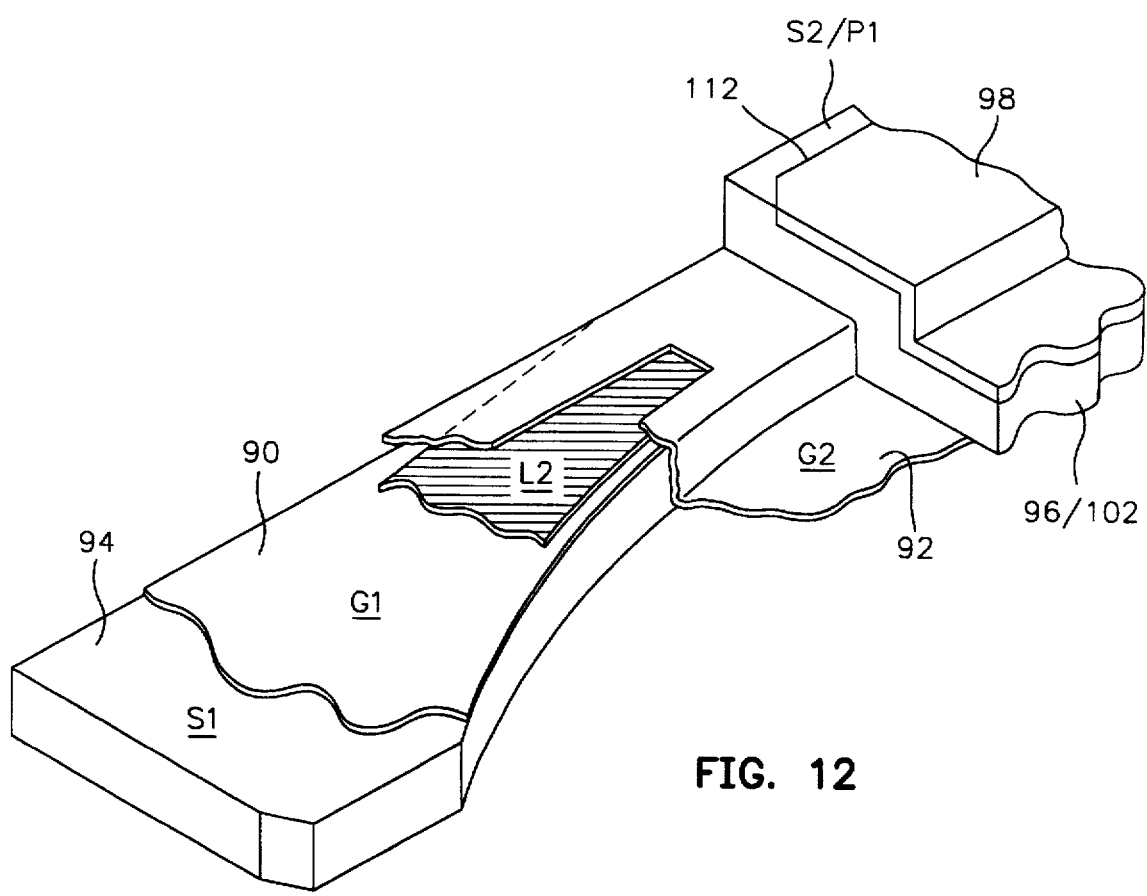
FIG. 12 is an isometric illustration of a detail of FIG. 11.

FIG. 10 is a plan view of the sunken S1 merged MR head 90 shown in FIG. 7 and FIGS. 11 and 12 show details of FIG. 10. FIGS. 10, 11 and 12 show an exemplary arrangement for first and second leads 116 and 118 which connect the MR sensor 62 to the processing circuitry 48 shown in FIG. 3. As shown in these figures the first and second leads extend substantially parallel to the ABS and are recessed slightly at conductive vias 120 and 122 where they are connected to first and second conductors 124 and 126. The conductors 124 and 126 are in turn connected by conductive vias 128 and 130 to a pair of external pads which are solder connected at 132 and 134 in FIG. 2 to leads (not shown) which extend to the processing circuitry 48. The remaining pair of solder connections 136 and 138 in FIG. 2 are connected to write coil pads 139 and 140 (FIG. 10) respectively by conductors (not shown) in the head.

Figure 13:
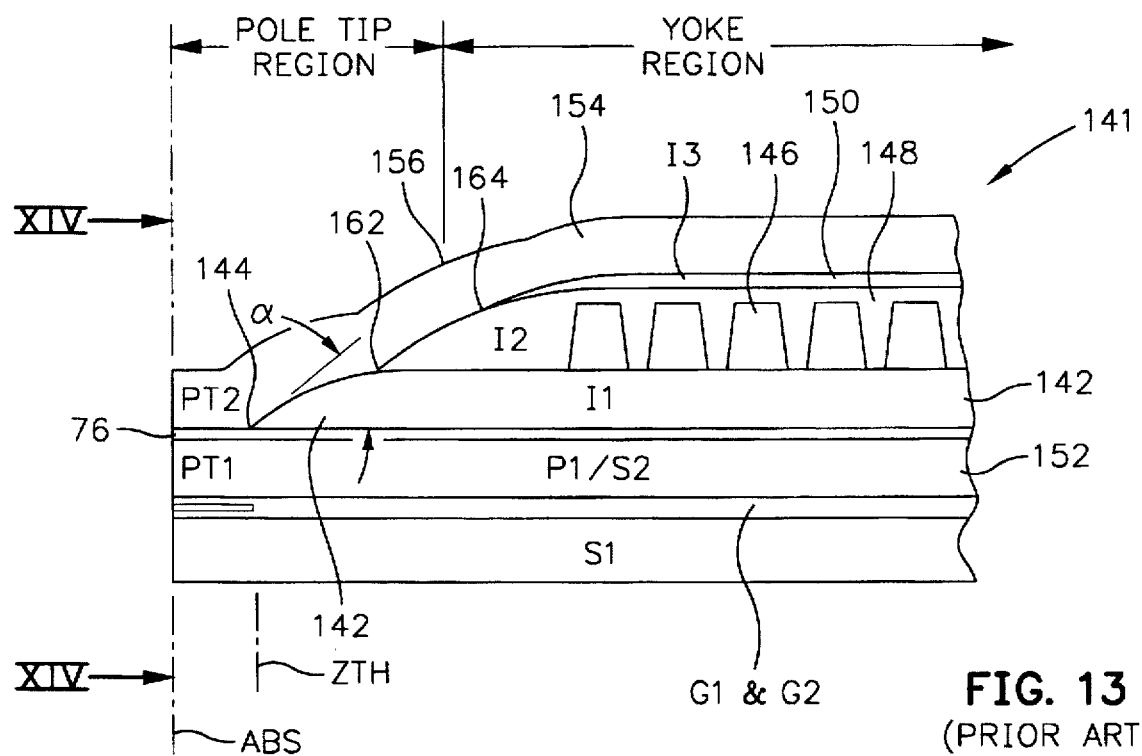
FIG. 13 is a elevation side view of a prior art merged head.

FIG. 13 illustrates a typical prior art merged MR head 141 wherein the first insulation layer 142 defines the zero throat at an apex 144. The apex angle α is the angle that the foremost slope of the insulation layer 142 makes with the plane of the gap layer 76 or makes with respect to a normal to the ABS. An apex angle α, listed in Table I, is between 20° and 40°. In the prior art the ZTH is typically located about 1.25 µm from the ABS. A coil layer 146 is embedded in a second insulation layer 148 and the second insulation layer 148 is sandwiched between the first and third insulation layers 142 and 150. The insulation layers 142, 148 and 150 are constructed of hardbaked photoresist. Upon baking, these resist layers develop sloping surfaces, each sloping surface commencing at a respective apex which has an apex angle. The combination of the first, second and third insulation layers 142, 148 and 150 is referred to as an insulation stack. The insulation stack is sandwiched between the first and second pole piece layers 152 and 154.

The flare point 156 of the prior art head 140 in FIG. 13 is distanced from the ZTH significantly further than the flare points 84 and 112 for the FIG. 4 and FIG. 7 embodiments of the invention. As shown in Table I the flare point for the prior art head in FIG. 13 is in the order of at least 10 µm from the ZTH. The reason for the distancing is to minimize reflective notching of the photoresist layer 160 (FIG. 15) that is employed for the construction of the second pole tip.

As shown in FIG. 4 a significant advantage of the present invention is that the ZTH can be accurately located relative to the interior end 62 of the MR sensor 52. This is important from the standpoint that when the head is lapped to the ABS, the ZTH and the stripe height accurately reflect the design parameters for the head. In the prior art head in FIG. 13 the first insulation layer 142 is constructed of hardbaked photoresist which is also the composition of the second and third insulation layers 148 and 150. After baking, the first insulation layer has a front slope with an apex 144. With the aforementioned post processing the location of the apex 144 of the first insulation layer can be recessed as much as 0.25 µm into the head from its original position due to the aforementioned sputtering steps during construction of the coil layer 146 and the second pole piece layer 154. In the present invention these sputtering steps do not relocate the ZTH by altering the location of the apex of the first insulation layer, with the unexpected result that the ZTH and the interior end 62 of the MR stripe retain their positions relative to one another in the head as shown in FIG. 4.

Figure 5:
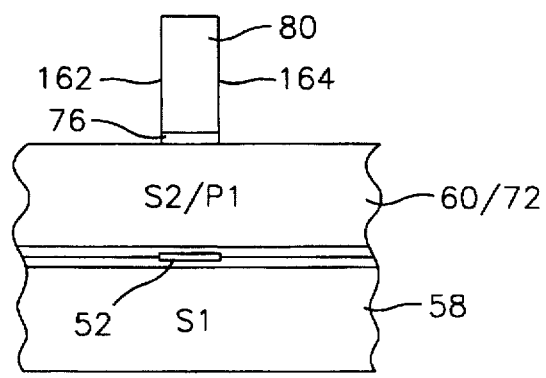
FIG. 5 is an ABS view of the head in FIG. 4 taken along plane V—V.
Figure 8:
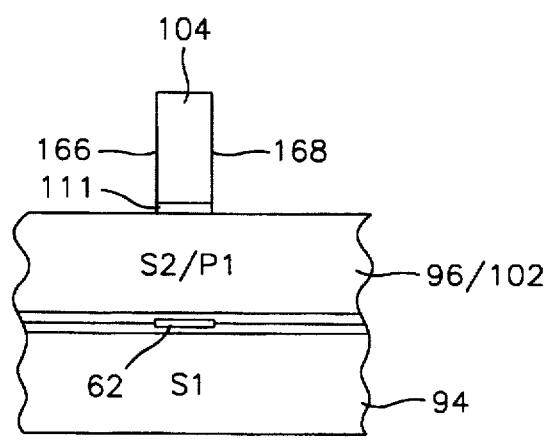
FIG. 8 is an ABS view of the magnetic head of FIG. 7 taken along plane VIII—VIII.
Figure 15:
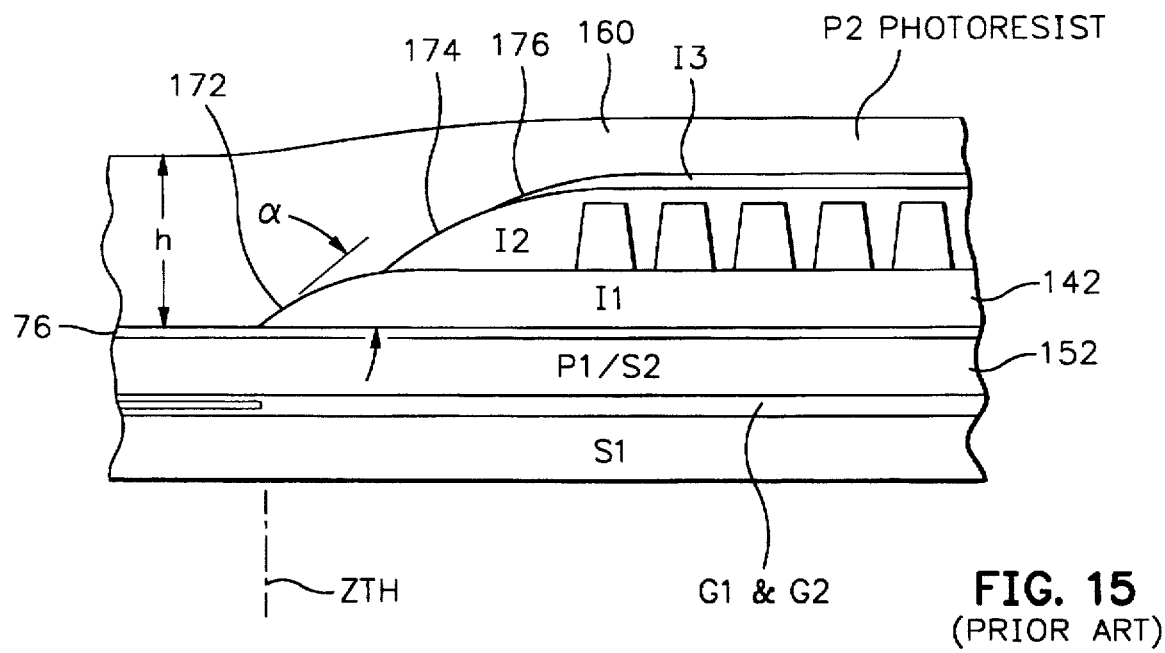
FIG. 15 is a side elevation view of a partially completed head of FIG. 13 with a photoresist step employed in the construction of the second pole tip.
Figure 14:
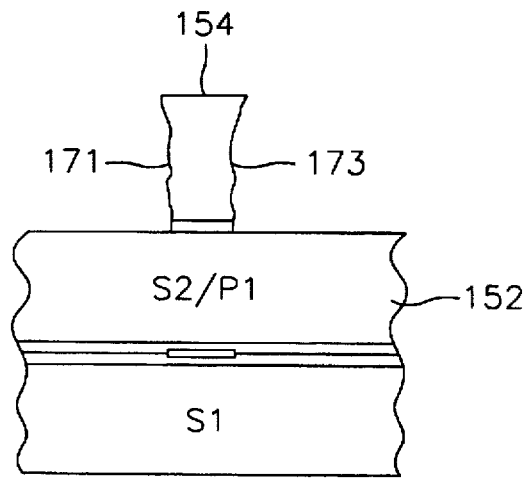
FIG. 14 is an ABS view of the head shown in FIG. 13 taken along plane XIV—XIV.

As shown in FIG. 5 the side walls 162 and 164 of the pole tip of the FIG. 4 embodiment are well defined as are the side walls 166 and 168 (shown in FIG. 8) for the pole tip of the FIG. 7 embodiment. Accordingly, the second pole tip is well defined when its side walls lie in vertical planes which are parallel with respect to one another and are perpendicular to the major plane of the first pole piece. In contrast, the side walls 171 and 173 of the second pole tip of the prior art head 140, shown in FIG. 14, are irregular and not well formed. This is because of reflective notching of the photoresist layer 160 in the pole tip region when the light imaging of the photoresist layer 160 is reflected from the sloping surfaces of the first, second and third insulation layers 142, 148 and 150. When photoresist 160 is spin coated on top of the partially completed head, as shown in FIG. 15, the photoresist partly planarizes across the insulation stack and the pole tip region. In the pole tip region the photoresist can be typically 12 μm thick, while the photoresist above the insulation stack can be 4.5 μm thick. Resolution is lost when light is exposed into the thick layer of photoresist for photo-patterning purposes. The light has to be intense enough to expose the full depth of the photoresist layer. When exposure light is directed through narrow slits in a mask during the imaging process the light defracts at the edges of the slits, causing poor imaging. A more serious problem is poor formation in forming of the side walls of the second pole tip due to the reflection of the light from the sloping forward edges of the first, second and third insulation layers 142, 148 and 150 during the light exposure step.

Figure 16:
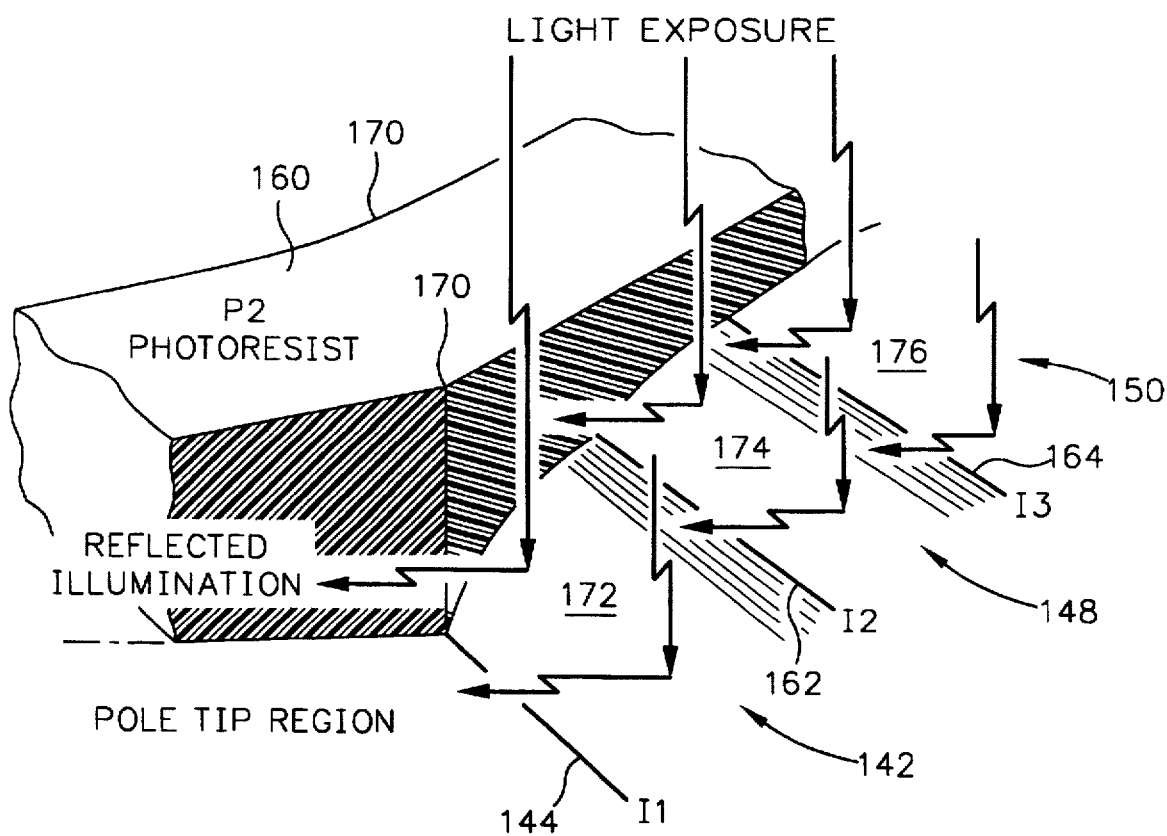
FIG. 16 is an isometric illustration of a portion of the photoresist layer employed for constructing the second pole tip in FIG. 13.

FIG. 16 is an exaggerated example of a prior art combined head where a flare point 170 is located directly above the ZTH at the apex 144 of the first insulation layer 142, to illustrate the magnitude of the problem caused by reflection. When light penetrates through the photoresist 160 in the area behind the flare point 170, it strikes the sloping surfaces 172, 174 and 176 of the insulation layers, whence it is reflected directly into the pole tip region where it penetrates the photoresist beyond the intended side walls of the second pole tip. This is called reflective notching and results in poorly formed photoresist walls for the patterning of the second pole tip. The result is that when the pole tip is plated it has a poorly defined line width and poor resolution as shown in FIG. 14. In order to overcome this problem, the prior art offsets the flare point 170 a significant distance (as much as 10 μm) from the ZTH. With this arrangement only a very narrow region (having the same width as the second pole tip) of the sloping surfaces of the insulation layers immediately behind the pole tip region is exposed and virtually no light is reflected into the photoresist in the pole tip region. The problem with this approach is that magnetic flux has to transition this very narrow portion of the second pole piece from the yoke to the ZTH which causes significant flux leakage between the pole tips. Accordingly, there is a strong-felt need to locate the flare point much closer to the ABS.

Figure 17:
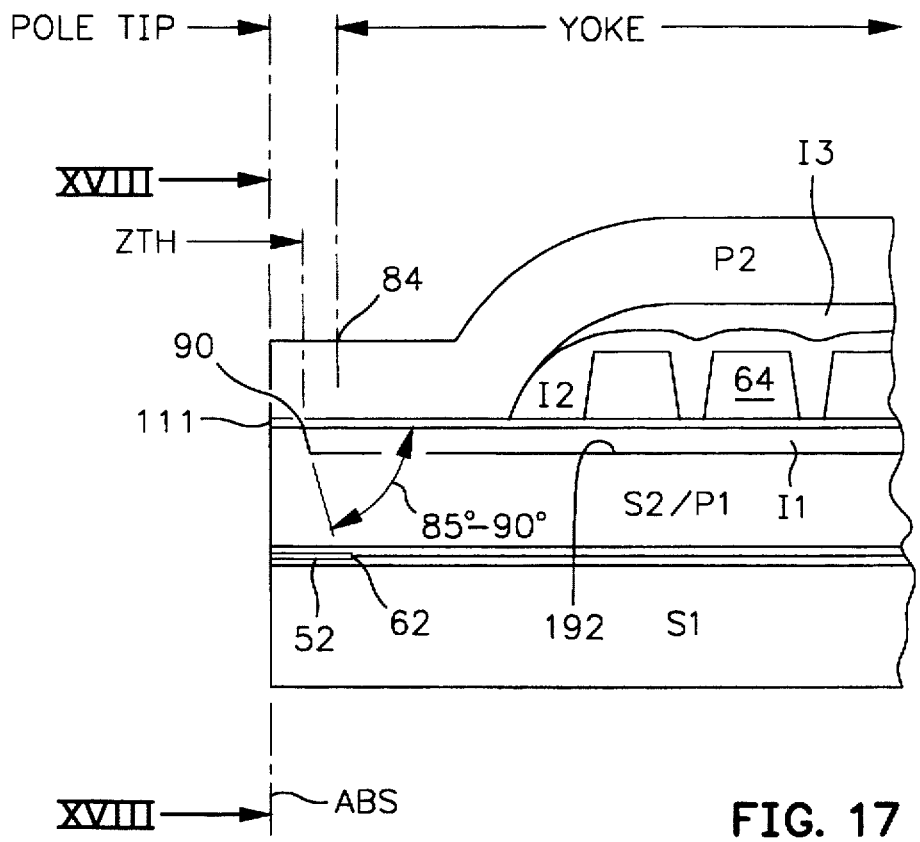
FIG. 17 is an elevation side view of the front portion of the first embodiment of the present invention.
Figure 18:
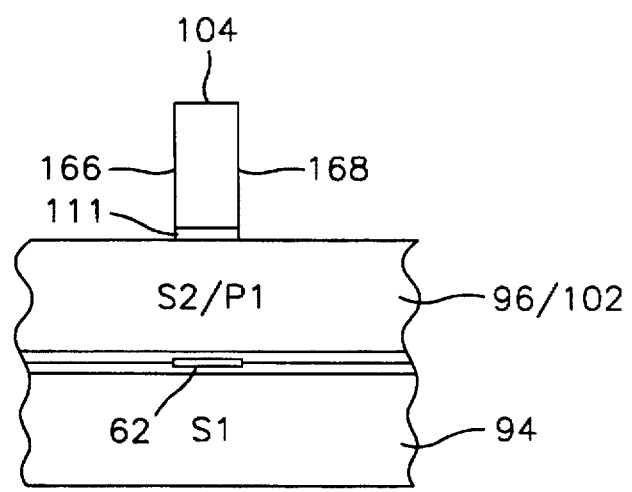
FIG. 18 is an ABS view of the magnetic head shown in FIG. 17 taken along plane XVIII—XVIII.
Figure 19:
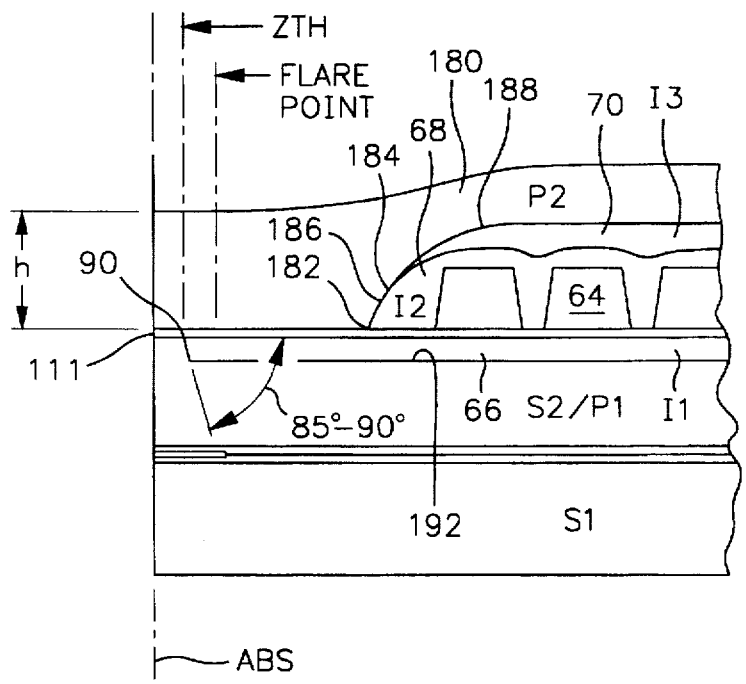
FIG. 19 is an elevation side view of a partially completed head shown in FIG. 17 with a photoresist step employed for the construction of the second pole tip.

FIG. 17 shows a front portion of the FIG. 4 embodiment of the invention. This portion of the head shows the close proximity of the ZTH 90 and the flare point 84 both to each other and to the ABS, which is a desirable result. Because the invention substantially eliminates reflective notching, the side walls 166 and 168, as shown in FIG. 18, are well defined. As shown in FIG. 19, a much thinner photoresist layer 180 can be employed for constructing the second pole tip since the height of the insulation stack is less than the prior art insulation stack. Further, the coil layer 64 can be thinner due to an increased tolerance for flux leakage between the yoke portion of the pole pieces in a write head or a merged MR head. Instead of a 12 μm thick photoresist layer at the ZTH a 5 μm photoresist layer may be employed as set forth in the table hereinabove. This is because the insulation stack height is much thinner and the impact of an apex angle is non-existent. Accordingly, the intensity of the light employed for photo-imaging can be significantly reduced.

Figure 20:
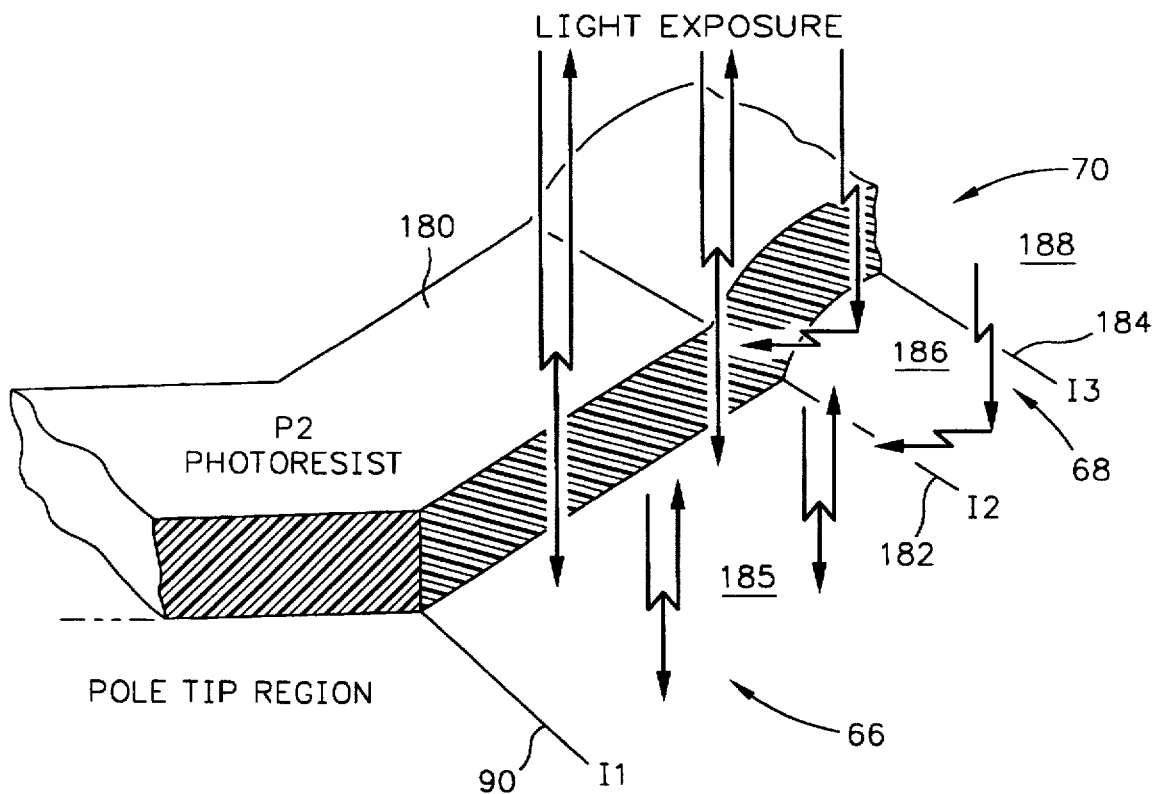
FIG. 20 is an isometric view of a portion of the photoresist layer employed for constructing the second pole tip of the magnetic head of FIG. 17.

More importantly, however, is the positive effect that a long flat region between the ABS and the apex 182 of the second insulation layer 68 has on construction of the second pole tip. Since this region is flat, the downwardly directed light employed for imaging will not be reflected laterally and therefore will not notch the photoresist layer in the pole tip region. FIG. 20 illustrates the lack of reflective notching with the present invention even though the flare point coincides with the ZTH which is an exaggerated scenario like that shown in FIG. 16. The third insulation layer 70 has an apex 184 as shown in FIGS. 19 and 20. The first insulation layer 66 does not have any sloping surface and is flat in the region 185. As shown in FIG. 20 the second and third insulation layers have sloping surfaces 186 and 188 respectively. In the region between the recess edge 90 and the apex 182 of the second insulation layer the flat surface 185 will cause the light employed for photo-imaging to be reflected only upwardly. Reflections from the sloping surfaces 186 and 188 of the second and third insulation layers are so minimal as to cause virtually no reflective notching of the photoresist 180 in the pole tip region.

Figure 22A:
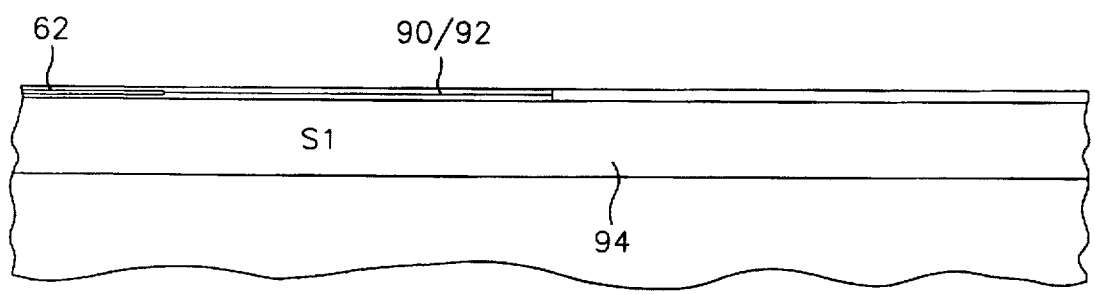
FIGS. 22A–22O show exemplary steps for constructing the second embodiment of the present magnetic head shown in FIG. 7.
Figure 23:
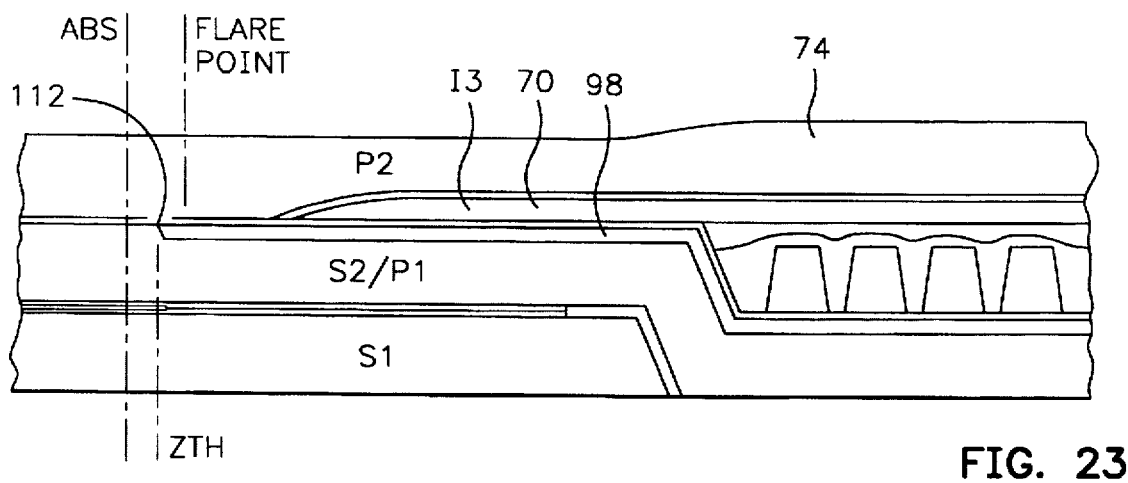
FIG. 23 illustrates a modification of FIG. 22O wherein a third insulation layer is located closer to the ZTH.

Another embodiment of the present invention is shown at 120 in FIG. 23. This embodiment is similar to the embodiment in FIG. 22O except: (1) a third insulation layer 189 is not planarized by lapping; (2) the third insulation layer 189 not only covers the second insulation layer 99 but it also covers a majority of the first insulation layer 98 in the recess 202. In a preferred embodiment the protective layer 204 is sandwiched between the first insulation layer 98 in the recess 202 and the third insulation layer 189 and is sandwiched between the first insulation layer 98 and the coil layer 64. Further, in a preferred embodiment the write gap layer 111 covers the third insulation layer 189 and the first insulation layer 98 forward of the third insulation layer to the ABS. This embodiment has an advantage over the embodiment in FIG. 22O in that the second pole piece 104 is further separated from the first pole piece 102 by the third insulation layer 189 over a majority of the first insulation layer in the recess 202 so as to minimize flux leakage between the pole pieces. Further, the process of making, to be described hereinafter, is simplified.

Figure 21A:
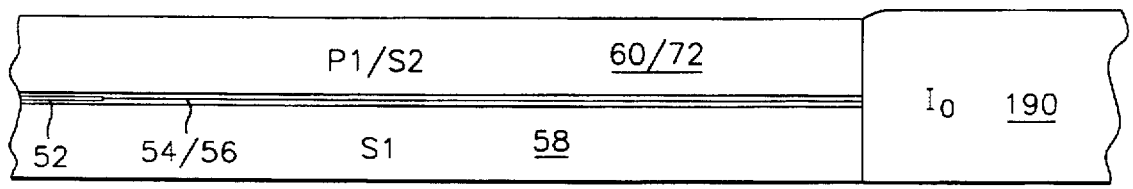
FIGS. 21A–21E illustrate exemplary steps for constructing the first embodiment of the present invention shown in FIG. 4.
Figure 21B:
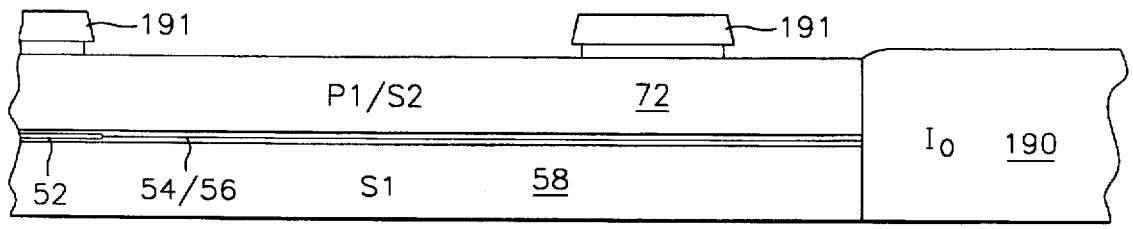
Figure 21C:
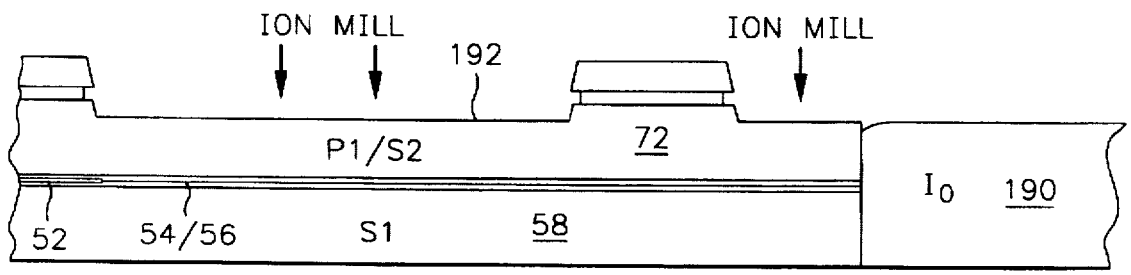
Figure 21D:
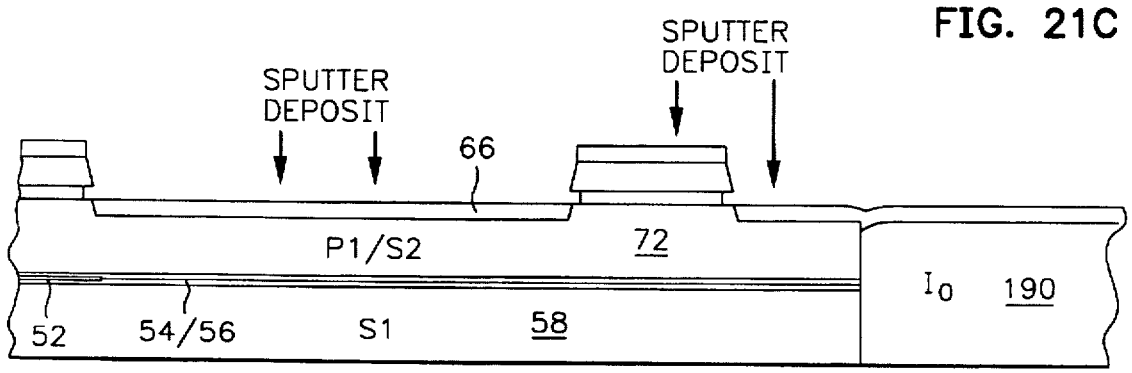
Figure 21E:
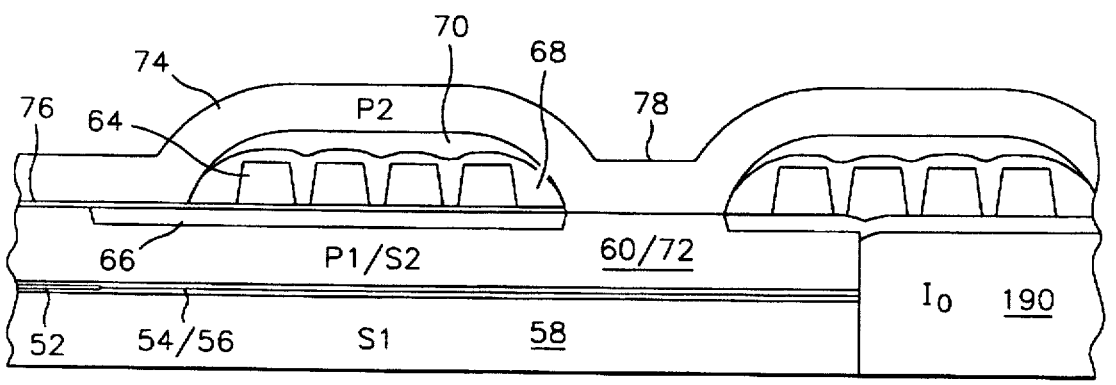

FIGS. 21A–21E show exemplary steps of making the merged MR head in FIG. 4. After forming the first shield layer 58, the first gap layer 54, the MR sensor 52, the second gap layer 56 and the second shield layer and first pole piece layer 60/72 an insulation layer 190 of photoresist is formed at the recessed steps of the aforementioned layers (except the MR sensor layer) for planarization purposes. In FIG. 21B a bilayer photoresist layer 191 is deposited which has top and bottom layers, the bottom layer being recessed laterally from the top layer. This bilayer photoresist may be formed by employing a bottom layer of photoresist which dissolves faster than the top layer of photoresist so as to provide the undercut configuration. The bilayer photoresist 191 masks the first pole piece layer 72 for the purpose of forming the first insulation layer 66. In FIG. 21C the first pole piece layer 72 is notched by any suitable means, such as ion milling, to form a recess 192, the ion milling also removing a top portion of the insulation layer 190. With the bilayer photoresist still in place the first insulation layer 66 is formed by sputtering as shown in FIG. 21D. The bilayer photoresist is then lifted off by dissolving the lower layer of the bilayer photoresist in a solution leaving the first insulation layer 66 as shown in FIG. 21E. The next step in the preferred embodiment is to form the gap layer 76 all the way from the front of the head to the back gap 78. Then the coil layer 64 and the second and third insulation layers 68 and 70 are formed. After sputtering and patterning a seedlayer the second pole piece layer 74 is formed employing the aforementioned resist layer 180 shown in FIG. 19.

Figure 22B:
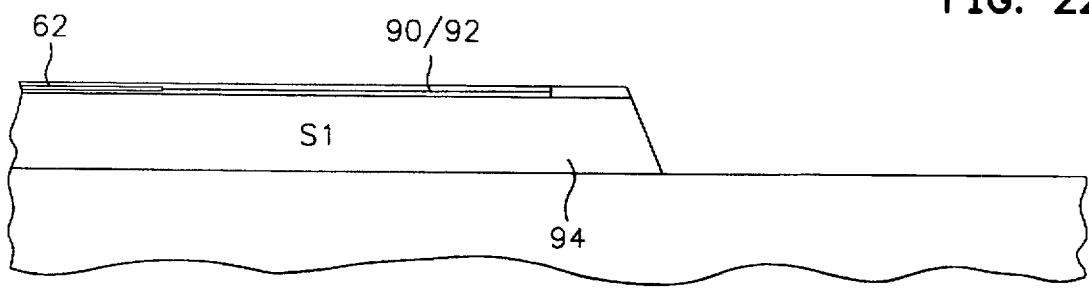
Figure 22C:
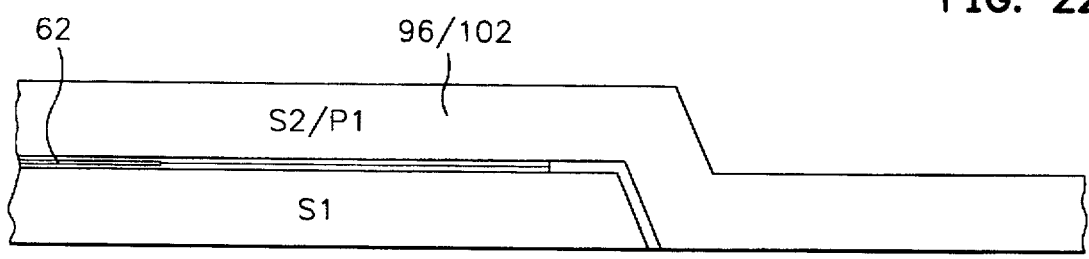
Figure 22D:
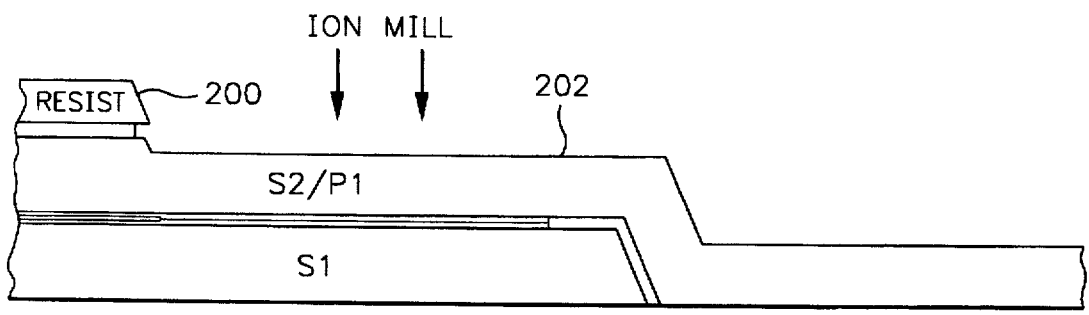
Figure 22E:
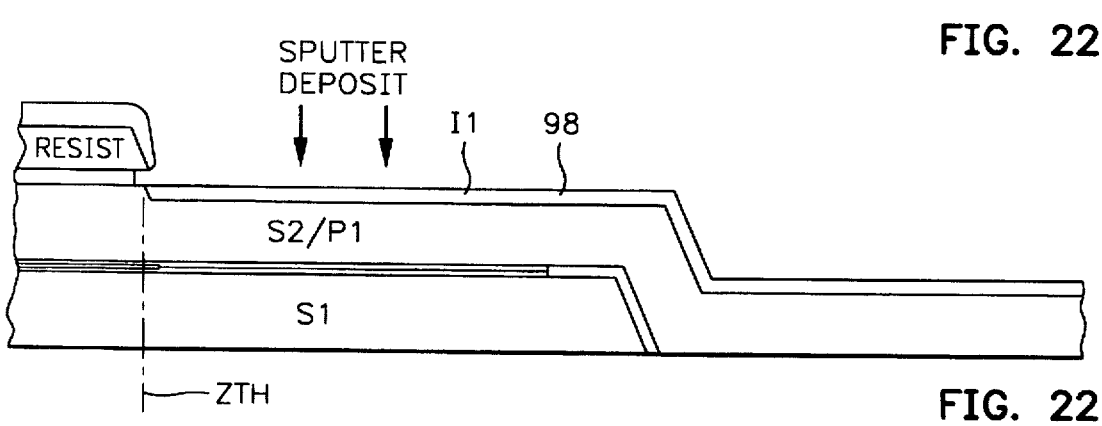
Figure 22F:
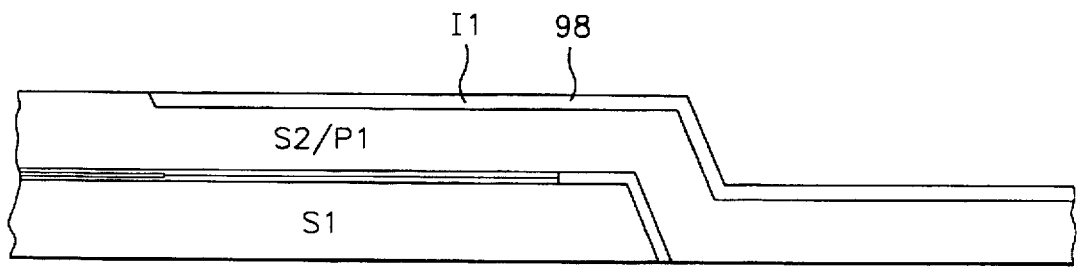
Figure 22G:
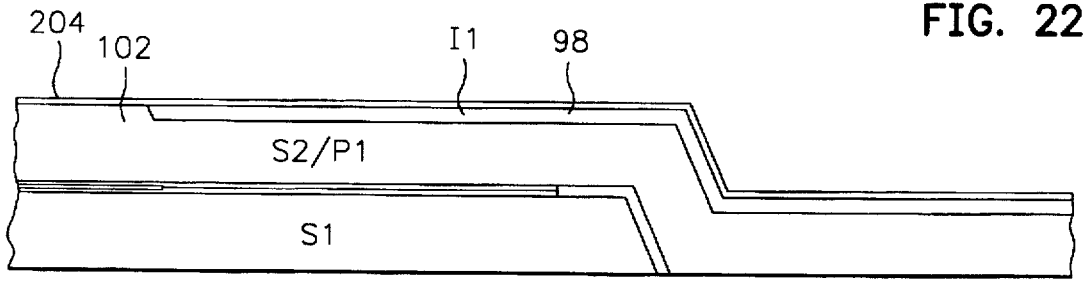
Figure 22H:
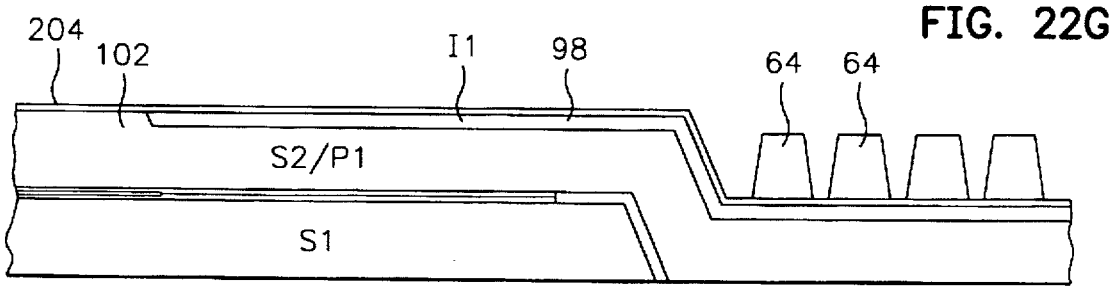
Figure 22I:
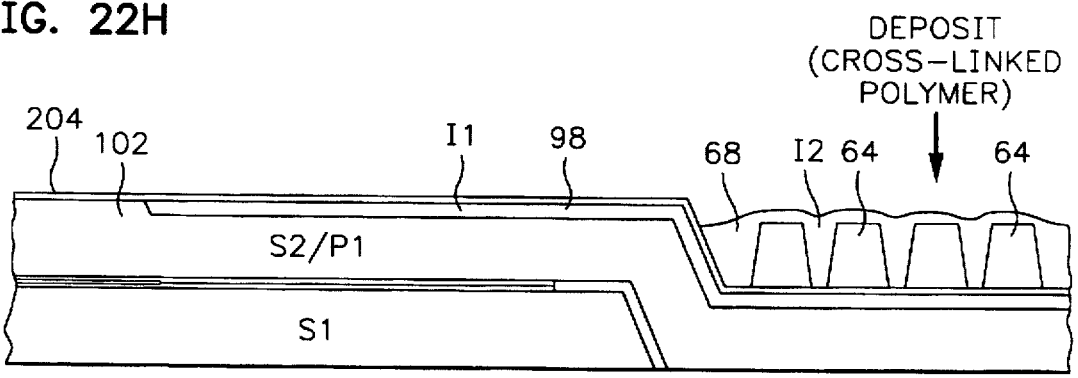
Figure 22J:
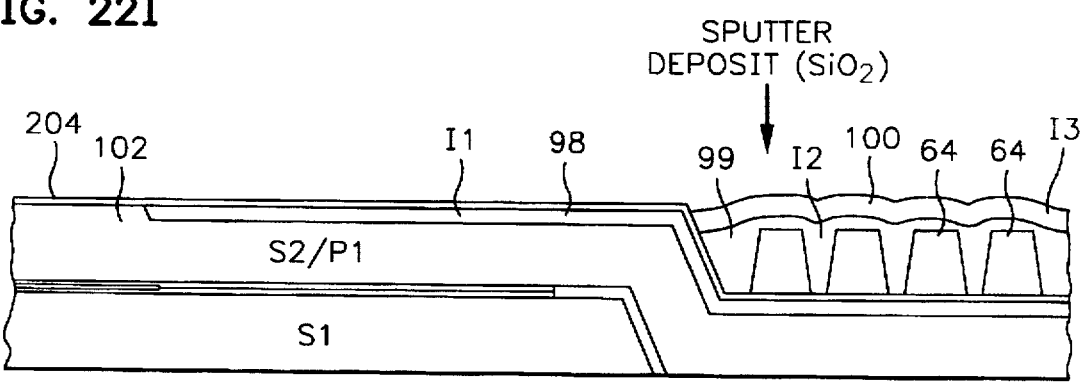
Figure 22K:
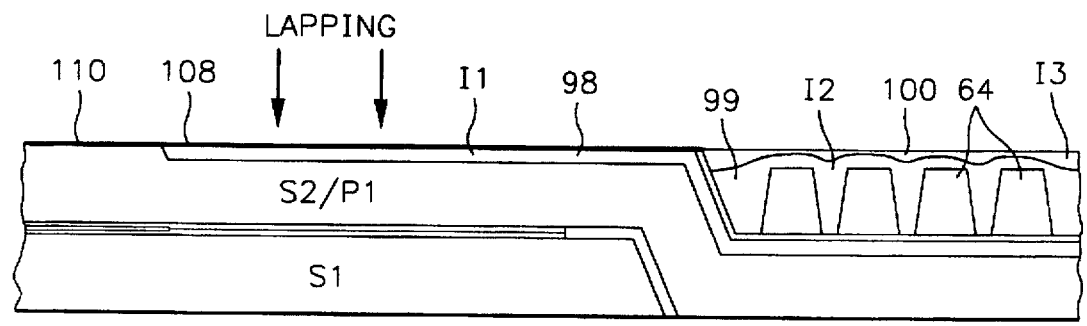
Figure 22L:
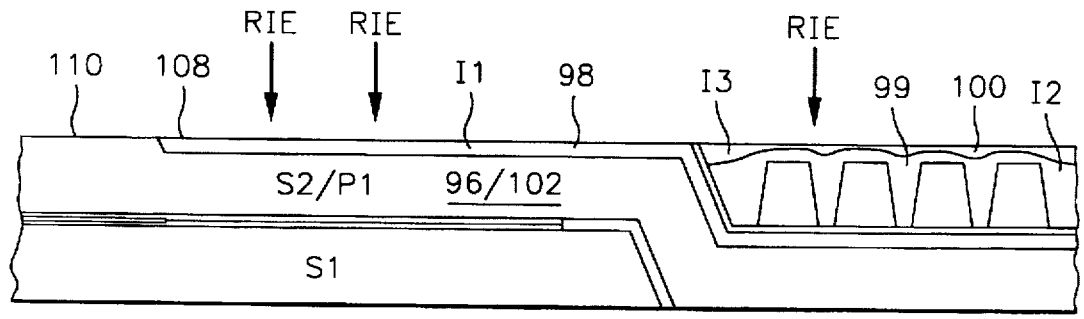
Figure 22M:
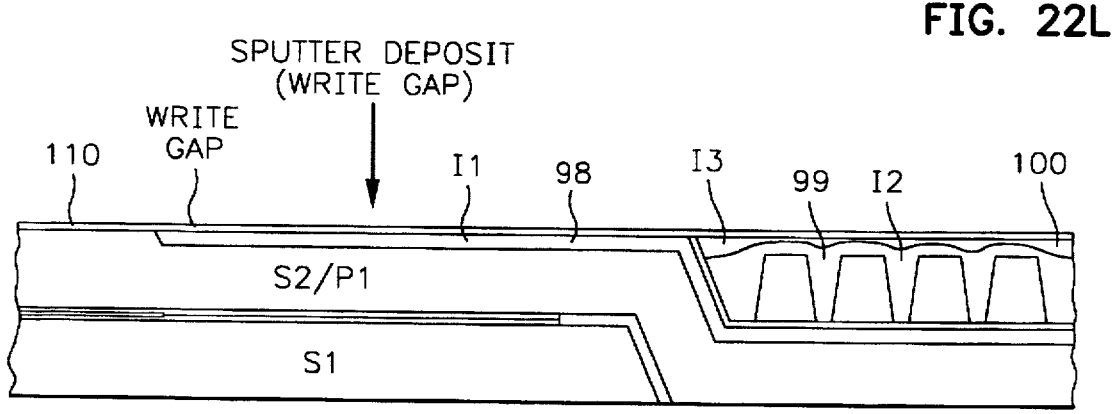
Figure 22N:
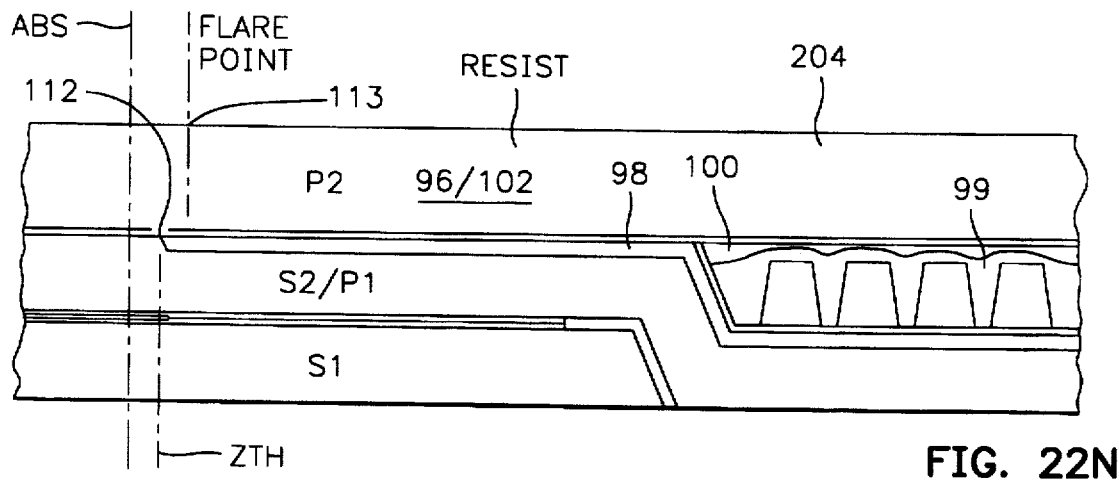
Figure 22:
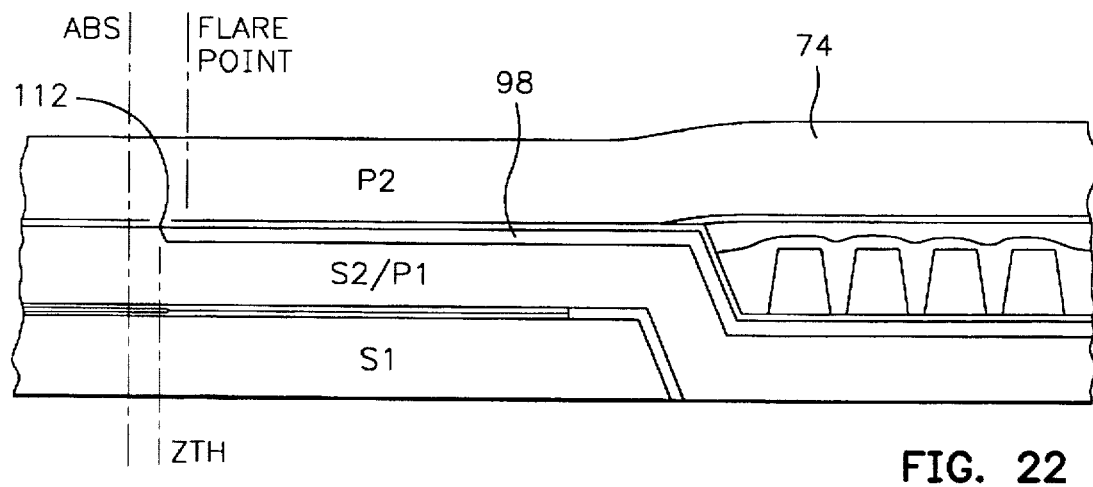

FIGS. 22A–22O show a series of steps in the construction of the sunken pole embodiment, shown in FIG. 7. In FIG. 22A the first shield layer 94, the MR sensor 62 and the first and second gap layers 90 and 92 are formed. In this figure the leads 116 and 118, shown in FIGS. 10–12, are also formed. In FIG. 22B the first shield layer 94 is milled so as to be shortened as shown in FIG. 7. In FIG. 22C the second shield layer and first pole piece layer 96/102 is deposited. In FIG. 22D a bilayer photoresist layer 200 is employed and ion milling is implemented for providing a recess 202 in the first pole piece layer 102. In FIG. 22E this recess is filled with the first insulation layer 98 by sputter deposition. In FIG. 22F the bilayer photoresist patterning layer 200 has been removed by a solvent. In FIG. 22G a protective layer 204 is sputter deposited on top of the first pole piece layer 102 and the first insulation layer 98. In FIG. 22H the coil layer 64 is plated after depositing a conductive seedlayer (not shown). In FIG. 22I the second insulation layer 99 is formed on top of the coil layer 64 by depositing a cross-linked polymer, such as photoresist. In FIG. 22J the third insulation layer 100 of Al₂O₃ or SiO₂ is sputter deposited on top of the second insulation layer 99 employing the bilayer lift-off process shown in FIG. 21D. In FIG. 22K the protective layer 204 is substantially removed and the third insulation layer 100 is planarized by lapping leaving a very thin residual layer of the protective layer shown by the heavy line on the planar surfaces 110 and 108 of the first pole piece layer 102 and the second insulation layer 99 respectively. Next, as shown in FIG. 22L, the partially completed head is reactive ion etched (RIE) to remove the thin residual layer of the protective layer 204 and provide a substantially coplanar surface across all three layers, namely the first pole piece layer 102, the first insulation layer 98 and the third insulation layer 100 of an insulation stack. It is desirable to make the first insulation layer 98 of Al₂O₃ or other material which cannot be reactive ion etched so that the etching will not substantially damage the first insulation layer 98 and to make the protective layer 204 of a reactive ion etchable material such as SiO₂. If chemical etching is employed the material of the first insulation layer 98 should be etch resistant and the material of the protective layer 204 should be etchable. In FIG. 22M the write gap layer 111 is deposited by sputter deposition. In FIG. 22N a photoresist layer 204 is spin coated on top of the partially completed head for the purposes of constructing the second pole piece with a well-defined second pole tip. The thickness of this resist layer 204 at the ZTH 112 can be even less than the thickness of the resist layer 180 in FIG. 19 for the FIG. 4 embodiment. As shown in the table hereinabove the thickness of the resist layer 204 can be in the order of 4 μm at the ZTH. In FIG. 22O the second pole piece layer 102 along with its pole tip is plated after depositing and patterning a seedlayer (not shown). This completes the essential components of the second embodiment of the head shown in FIG. 7.

The method of making the FIG. 23 embodiment 120 includes the steps shown in FIGS. 22A–22I. The third insulation layer 189 is then photo-patterned and baked to cover the second insulation layer 99 and a majority of the first insulation layer 98 in the recess 202, as shown in FIG. 23. The protective layer 204 is then removed, such as by reactive ion etching, from the apex 124 of the third insulation layer to the ABS. A write gap layer 206 is then formed on top of the third insulation layer 122 and the first insulation layer 98 forward of the apex 124 to the ABS. In a preferred embodiment the protective layer 204 is SiO₂ which can be reactive ion etched and the first insulation layer 98 is Al₂O₃ which cannot be easily reactive ion etched.

Table I shows the many advantages of the first and second embodiments of the present invention, shown in FIGS. 4 and 7 respectively, over the prior art head shown in FIG. 13. For example, the thickness of the first insulation layer can be less than half of the thickness of the insulation layer of the prior art head. Further, the second and third insulation layers can be approximately half the thickness of the second and third insulation layers of the prior art head. The second pole piece layer in the invention can be thinner than the second pole piece of the prior art head. It is particularly important that the flare point of the present heads are significantly closer to the ZTH than the flare point of the prior art head. The flare point for the present heads can be as close as the ZTH, whereas the flare point for the prior art head is typically 10 μm from the ZTH. Further, the ZTH of the present heads can be closer to the ABS than the ZTH for the prior art head since its proximity to the ABS does not affect or cause reflective notching when the second pole tip is constructed. Also, the apex angle of the first insulation layer recessed into the first pole piece can be on the order of 45°–90° as compared to 20°–40° for the prior art head. This means that the first and second pole pieces are quickly separated rather than gradually separated. Also of particular importance is that the thickness of the photoresist layer at the ZTH in the present heads is much less than the thickness of the photoresist layer at the ZTH in the prior art head. Accordingly, the intensity of the light employed for photo-imaging the photoresist layer can be reduced for the present invention. Comparison of the stack heights is shown in the last row of the table.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head with a pole tip region extending from an air bearing surface (ABS) to a flare point and a yoke region extending from the flare point to a back gap region, the magnetic head comprising:

an insulation stack including at least first and second insulation layers;

a coil layer;

the coil layer being sandwiched between the first and second insulation layers;

first and second pole piece layers;

a gap layer;

the first and second pole piece layers having first and second pole tips, respectively, located in said pole tip region and being separated by the gap layer at said ABS, first and second yoke portions in said yoke region, and a back gap located in said back gap region;

the first and second insulation layers being sandwiched between the first and second pole piece layers;

each of the first pole piece and the first insulation layer having a first planar surface;

a first recess in the first planar surface of the first pole piece;

the first insulation layer being inset in said first recess;

the first insulation layer having a length which extends between first and second ends, the first end being spaced from the ABS and the second end being located between the first end and the back gap;

the first end of the first insulation layer defining a zero throat height (ZTH) of the head at an edge of said recess;

the second insulation layer having first and second apexes;

a first region in the head extending from the ABS to the first apex;

a second region in the head extending from the first apex to the second apex;

the first insulation layer being located in the first and second regions and the second insulation layer and the coil layer being located in the second region;

a second recess in the first planar surface of the first pole piece that is sunken with respect to the first recess; and the second insulation layer and the coil layer being located in said second recess.

2. A magnetic head as claimed in claim 1 wherein the first planar surfaces of the first insulation layer and the first pole piece lie substantially in a common plane.

3. A magnetic head as claimed in claim 2 wherein the first insulation layer is aluminum oxide.

4. A magnetic head as claimed in claim 2 wherein the first insulation layer is silicon dioxide.

5. A magnetic head as claimed in claim 2 wherein the first insulation layer is inset in the recess substantially 1 μm.

6. A magnetic head as claimed in claim 2 wherein the distance from the ABS to the ZTH is less than 1 μm.

7. A magnetic head as claimed in claim 6 wherein the distance between the ZTH and the flare point being less than 4 μm.

8. A magnetic head as claimed in claim 6 wherein the distance between the ABS and the ZTH is substantially 0.65 μm.

9. A magnetic head as claimed in claim 2 wherein said flare point is located in the first region.

10. A magnetic head as claimed in claim 9 wherein the first insulation layer is a dielectric material, such as aluminum oxide or silicon dioxide.

11. A magnetic head as claimed in claim 10 wherein the distance between the ABS and the ZTH is less than 1 μm.

12. A magnetic head as claimed in claim 11 wherein the distance between the ZTH and the flare point is less than 4 μm.

13. A magnetic head as claimed in claim 10 including:

a write gap layer extending throughout the first and second regions and being sandwiched between the first insulation layer and the coil layer.

14. A magnetic head as claimed in claim 10 including:

the second insulation layer having first and second ends;

a first region which extends from the ABS to said first end of the second insulation layer and a second region which extends from the first end of the second insulation layer to the second end of the second insulation layer;

the first insulation layer being located in the first and second regions and the second insulation layer and the coil layer being located in the second region;

the first planar surfaces of the first pole piece and the first insulation layer lying in a common plane within the first region; and the first insulation layer having a second planar surface and a sloping surface in the second region, the second planar surface of the first insulation layer being stepped with respect to the first planar surface of the first insulation layer and joined thereto by said sloping surface.

15. A magnetic head as claimed in claim 14 including:

the second pole piece having a yoke portion in the yoke region; and said yoke portion having a thickness bounded by first and second planar surfaces which are substantially parallel to said common plane throughout said first and second regions.

16. A magnetic head as claimed in claim 15 wherein the first insulation layer is a dielectric material, such as aluminum oxide or silicon dioxide.

17. A magnetic head as claimed in claim 16 wherein the distance between the ABS and the ZTH is less than 1 μm.

18. A magnetic head as claimed in claim 17 wherein the distance between the ZTH and the flare point being less than 4 μm.

19. A magnetic head as claimed in claim 18 wherein the write gap layer extends throughout the first and second regions and is sandwiched between the second insulation layer and the coil layer.

20. A magnetic head as claimed in claim 14 including:

a third insulation layer covering a majority of the first insulation layer in said first region and covering the second insulation layer in the second region.

21. A magnetic head as claimed in claim 20 including:

a protective layer located between the first and third insulation layers.

22. A magnetic head as claimed in claim 21 including:

a write gap layer on the first insulation layer and on the third insulation layer.

23. A magnetic head as claimed in claim 22 wherein the protective layer is a reactive ion etchable material and the first insulation layer is a reactive ion non-etchable material.

24. A magnetic head as claimed in claim 23 wherein the protective layer is $Al_2O_3$ and the first insulation layer is $SiO_2$.

25. A magnetic head as claimed in claim 24 wherein the distance between the ABS and the ZTH is less than 1 μm.

26. A magnetic head as claimed in claim 25 wherein the distance between the ZTH and the flare point being less than 4 μm.

27. A magnetic head comprising:

a first pole piece layer which has a first recess, the first recess having a recess edge;

a first insulation layer located within and filling said first recess so as to have an end immediately adjacent said recess edge;

said end of the first insulation layer defining a zero throat height (ZTH);

the first pole piece having a second recess which is sunken with respect to the first recess; and a coil layer and a second insulation layer located in said second recess.

28. A magnetic head as claimed in claim 27 including:

the first insulation layer also being located in said second recess.

29. A magnetic head as claimed in claim 28 including:

a protective layer located in said second recess and sandwiched between the first insulation layer and the coil layer; and a write gap layer on all of the first insulation layer which is located in said first recess.

30. A magnetic head as claimed in claim 29 further including an air bearing surface (ABS), wherein the distance between the ABS and the ZTH is less than 1 µm.

31. A magnetic head as claimed in claim 30 further including a flare point wherein the distance between the ZTH and the flare point being less than 4.0 µm.

32. A magnetic head as claimed in claim 31 wherein the first insulation layer is a dielectric material, such as aluminum oxide or silicon dioxide.

33. A magnetic head as claimed in claim 28 including:

the second insulation layer being on the coil layer; and a third insulation layer on the second insulation layer and a majority of a portion of the first insulation layer which is located in said first recess.

34. A magnetic head as claimed in claim 33 including:

a protective layer sandwiched between the first insulation layer and the coil layer in said second recess and sandwiched between said portion of the first insulation layer and said third insulation layer; and a write gap layer on the first insulation layer and the third insulation layer.

35. A magnetic head as claimed in claim 34 further including an air bearing surface (ABS), wherein the distance between the ABS and the ZTH is less than 1 µm.

36. A magnetic head as claimed in claim 35 further including a flare point wherein the distance between the ZTH and the flare point being less than 4.0 µm.

37. A magnetic head as claimed in claim 36 wherein the first insulation layer is a dielectric material, such as aluminum oxide or silicon dioxide.

38. A magnetic disk drive, comprising:

a frame;

a magnetic disk rotatably supported in the frame;

a support mounted on the frame;

a combined magnetic head with an air bearing surface, the combined magnetic head mounted to the support in a transducing relationship with the magnetic disk, the combined magnetic head including a write head and a read head;

the write head including:

a first pole piece layer which has a first recess, the first recess having a recess edge;

a first insulation layer located within and filling said first recess so as to have an end immediately adjacent said recess edge;

said end of the first insulation layer defining a zero throat height (ZTH);

the first pole piece having a second recess which is sunken with respect to the first recess;

a coil layer and a second insulation layer located in said second recess;

the read head including:

a sensor sandwiched between first and second gap layers; and the first and second gap layers being sandwiched between first and second shield layers;

the first pole piece and the second shield layer being a common layer;

means for rotating the magnetic disk;

positioning means connected to the support for moving the combined magnetic head to multiple positions with respect to said magnetic disk; and means connected to the combined magnetic head, to the means for rotating the magnetic disk, and to the positioning means for exchanging signals with the combined head, for controlling movement of the magnetic disk and for controlling the position of the combined head.

39. A combined magnetic head with an air bearing surface (ABS), including:

a write head with a pole tip region extending from the ABS to a flare point and a yoke region extending from the flare point to a back gap region, the write head including:

a first pole piece layer which has a first recess, the first recess having a recess edge;

a first insulation layer located within and filling said first recess so as to have an end immediately adjacent said recess edge;

said end of the first insulation layer defining a zero throat height (ZTH);

the first pole piece having a second recess which is sunken with respect to the first recess; and a coil layer and a second insulation layer located in said second recess;

a read head including:

a sensor sandwiched between first and second gap layers; and the first and second gap layers being sandwiched between first and second shield layers; and the first pole piece and the second shield layer being a common layer.

40. An inductive magnetic head that has an air bearing surface (ABS) comprising:

first and second pole piece layers;

a first insulation layer;

the first pole piece having a first recess which has a recess edge that is spaced from the ABS;

the first insulation layer being inset in said recess and engaging said recess edge so as to define a zero throat height (ZTH) at the recess edge;

a second insulation layer having first and second apexes;

a coil layer;

a first region in the head extending from the ABS to the first apex;

a second region in the head extending from the first apex to the second apex;

the first insulation layer being located in the first region and the second insulation layer and the coil layer being located only in the second region;

the first pole piece having a second recess that is sunken with respect to the first recess; and the second insulation layer and the coil layer being located in said second recess.

41. A magnetic head as claimed in claim 40 wherein the first insulation layer is also located in said second region.

42. A magnetic head as claimed in claim 41 including:

each of the first pole piece layer and the first insulation layer having a planar surface; and the planar surfaces of the first insulation layer and the first pole piece layer lying substantially in a common plane.

43. A magnetic head as claimed in claim 42 wherein the first insulation layer is aluminum oxide.

44. A magnetic head as claimed in claim 43 wherein the first insulation layer is silicon dioxide.

45. A magnetic head as claimed in claim 42 further including an air bearing surface (ABS) wherein the distance between the ABS and the ZTH is less than 1 μm.

46. A magnetic head as claimed in claim 42 further including a flare point wherein the distance between the ZTH and the flare point being less than 4.0 μm.

47. A magnetic head as claimed in claim 46 wherein the first insulation layer is a dielectric material, such as aluminum oxide or silicon dioxide.

48. A magnetic disk drive, comprising:
a frame;
a magnetic disk rotatably supported in the frame;
a support mounted on the frame;
a combined head with an air bearing surface, the combined head mounted to the support in a transducing relationship with the magnetic disk, the combined head including:
first and second pole piece layers;
a first insulation layer;
the first pole piece having a first recess which has a recess edge that is spaced from the ABS;
the first insulation layer being inset in said recess and engaging said recess edge so as to define a zero throat height (ZTH) at the recess edge;
a second insulation layer having first and second apexes;
a coil layer;
a first region in the head extending from the ABS to the first apex;
a second region in the head extending from the first apex to the second apex;
the first insulation layer being located in the first region and the second insulation layer and the coil layer being located only in the second region;
the first pole piece having a second recess that is sunken with respect to the first recess; and
the second insulation layer and the coil layer being located in said second recess;
a read element including:
a sensor sandwiched between first and second gap layers; and
the first and second gap layers being sandwiched between first and second shield layers;
the first pole piece and the second shield layer being a common layer;
means for rotating a magnetic disk;
positioning means connected to the support for moving the combined head to multiple positions with respect to said magnetic disk; and
means connected to the combined head, to the means for rotating the magnetic disk, and to the positioning means for exchanging signals with the combined head, for controlling movement of the magnetic disk and for controlling the position of the combined head.

49. A combined magnetic head with an air bearing surface (ABS), including:
a write head with a pole tip region extending from the ABS to a flare point and a yoke region extending from the flare point to a back gap region, and including:

first and second pole piece layers;
a first insulation layer;
the first pole piece having a first recess which has a recess edge that is spaced from the ABS;
the first insulation layer being inset in said recess and engaging said recess edge so as to define a zero throat height (ZTH) at the recess edge;
a second insulation layer having first and second apexes;
a coil layer;
a first region in the head extending from the ABS to the first apex;
a second region in the head extending from the first apex to the second apex;
the first insulation layer being located in the first region and the second insulation layer and the coil layer being located only in the second region;
the first pole piece having a second recess that is sunken with respect to the first recess; and
the second insulation layer and the coil layer being located in said second recess;
a read head including:
a sensor sandwiched between first and second gap layers;
the first and second gap layers being sandwiched between first and second shield layers; and
the first pole piece and the second shield layer being a common layer.

50. A magnetic head with a pole tip region extending from an air bearing surface (ABS) to a flare point and a yoke region extending from the flare point to a back gap region, the magnetic head comprising:
an insulation stack including at least first and second insulation layers;
a coil layer;
the coil layer being sandwiched between the first and second insulation layers;
first and second pole piece layers;
a gap layer;
the first and second pole piece layers having first and second pole tips, respectively, located in said pole tip region and being separated by the gap layer at said ABS, first and second yoke portions in said yoke region, and a back gap located in said back gap region;
the first and second insulation layers being sandwiched between the first and second pole piece layers;
each of the first pole piece and the first insulation layer having a first planar surface;
a first recess in the first planar surface of the first pole piece;
the first insulation layer being inset in said first recess;
the first insulation layer having a length which extends between first and second ends, the first end being spaced from the ABS and the second end being located between the first end and the back gap;
the first end of the first insulation layer defining a zero throat height (ZTH) of the head at an edge of said recess;
the second insulation layer having first and second apexes;
a first region in the head extending from the ABS to the first apex;
a second region in the head extending from the first apex to the second apex;

the first insulation layer being located in the first and second regions and the second insulation layer and the coil layer being located in the second region;

a second recess in the first planar surface of the first pole piece that is sunken with respect to the first recess;

the second insulation layer and the coil layer being located in said second recess;

the first planar surfaces of the first insulation layer and the first pole piece lying substantially in a common plane; and the first insulation layer being inset in the first recess substantially 1 μm.

* * * * *